US 011760313B2

(12) United States Patent
Adams et al.

(10) Patent No.: US 11,760,313 B2
(45) Date of Patent: Sep. 19, 2023

(54) SENSOR POD CLEANING SYSTEM

(71) Applicant: Zoox, Inc., Foster City, CA (US)

(72) Inventors: Derek Adams, Santa Clara, CA (US);
Daniel Glenn Johnson, San Francisco, CA (US); Christopher William Labadie, San Francisco, CA (US); Ryan McMichael, Mountain View, CA (US); Daniel Miller, San Jose, CA (US); Peter Thomas Mitros, San Carlos, CA (US); Anubhav Thakur, San Francisco, CA (US); Joseph Patrick Warga, San Francisco, CA (US); Austin In-Jei Yi, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 96 days.

(21) Appl. No.: 16/864,146

(22) Filed: Apr. 30, 2020

(65) Prior Publication Data
US 2021/0339710 A1    Nov. 4, 2021

(51) Int. Cl.
| | | |
|---|---|---|
| *B60S 1/52* | (2006.01) | |
| *B60S 1/54* | (2006.01) | |
| *B60S 1/50* | (2006.01) | |
| *B08B 3/02* | (2006.01) | |
| *B08B 5/02* | (2006.01) | |

(Continued)

(52) U.S. Cl.
CPC .............. *B60S 1/52* (2013.01); *B08B 3/02* (2013.01); *B08B 3/08* (2013.01); *B08B 5/02* (2013.01); *B60S 1/50* (2013.01); *B60S 1/54* (2013.01); *G01S 13/931* (2013.01); *G01S 15/931* (2013.01); *G01S 7/4004* (2013.01); *G01S 7/4043* (2021.05); *G01S 7/497* (2013.01);

(Continued)

(58) Field of Classification Search
None
See application file for complete search history.

(56) References Cited

U.S. PATENT DOCUMENTS

| | | |
|---|---|---|
| 9,340,231 B1 | 5/2016 | Minahan et al. |
| 9,817,397 B1 | 11/2017 | Larner et al. |

(Continued)

FOREIGN PATENT DOCUMENTS

| | | |
|---|---|---|
| EP | 2431225 A1 | 3/2012 |
| WO | WO2012113362 | 8/2012 |

(Continued)

OTHER PUBLICATIONS

Office Action for U.S. Appl. No. 16/864,138, dated Dec. 13, 2021, Adams, "Sensor Pod Calibration" (7 pages).

(Continued)

*Primary Examiner* — Spencer E. Bell
*Assistant Examiner* — Omair Chaudhri
(74) *Attorney, Agent, or Firm* — Lee & Hayes, P.C.

(57) ABSTRACT

A sensor pod system includes one or more sensor pods with a plurality of sensors configured to collect data from an environment. The sensor pod system may include a cleaning system to clean sensing surfaces of sensor pods during operation. The sensor pod system may include sensors of different types and modalities. Sensor pods of the sensor pod system may be modularly installed on a vehicle, for example, an autonomous vehicle and collect and provide data of the environment during operation of the vehicle.

20 Claims, 16 Drawing Sheets

(51) Int. Cl.
*B08B 3/08* (2006.01)
*G01S 13/931* (2020.01)
*G01S 15/931* (2020.01)
*G01S 7/52* (2006.01)
*G01S 7/40* (2006.01)
*G01S 7/497* (2006.01)

(52) U.S. Cl.
CPC ... *G01S 7/52004* (2013.01); *G01S 2007/4977* (2013.01); *G01S 2007/52011* (2013.01)

(56) References Cited

U.S. PATENT DOCUMENTS

| | | | |
|---|---|---|---|
| 10,109,183 B1 | 10/2018 | Franz et al. | |
| 10,579,882 B1 | 3/2020 | Domper | |
| 10,599,931 B2 | 3/2020 | Miville et al. | |
| 2008/0203742 A1 | 8/2008 | Takahashi | |
| 2010/0053593 A1* | 3/2010 | Bedros | G01S 17/931 |
| | | | 356/5.01 |
| 2013/0092758 A1* | 4/2013 | Tanaka | B60S 1/52 |
| | | | 239/284.1 |
| 2013/0141526 A1 | 6/2013 | Banta et al. | |
| 2014/0368651 A1 | 12/2014 | Irschara et al. | |
| 2015/0203076 A1* | 7/2015 | Irie | B60S 1/56 |
| | | | 15/319 |
| 2015/0329037 A1 | 11/2015 | Lombrozo | |
| 2015/0329083 A1* | 11/2015 | Kiyohara | B60R 1/00 |
| | | | 348/148 |
| 2015/0353024 A1* | 12/2015 | Cooper | B60R 11/04 |
| | | | 348/148 |
| 2015/0353057 A1* | 12/2015 | Witte | B60S 1/0848 |
| | | | 134/115 R |
| 2016/0004144 A1* | 1/2016 | Laroia | H04N 5/2171 |
| | | | 348/222.1 |
| 2016/0297437 A1 | 10/2016 | Hara et al. | |
| 2016/0375876 A1* | 12/2016 | Silc | B60S 1/54 |
| | | | 134/37 |
| 2017/0232909 A1 | 8/2017 | Kuehnle | |
| 2018/0086316 A1* | 3/2018 | Trebouet | B08B 3/08 |
| 2018/0126921 A1* | 5/2018 | Koseki | B08B 5/02 |
| 2018/0134234 A1 | 5/2018 | Nickolaou et al. | |
| 2018/0143298 A1* | 5/2018 | Newman | G01C 21/3484 |
| 2018/0186341 A1* | 7/2018 | Kimura | H04N 7/18 |
| 2018/0236958 A1* | 8/2018 | Horiuchi | B62D 25/082 |
| 2018/0251099 A1* | 9/2018 | Satarino | B60S 1/50 |
| 2018/0265015 A1* | 9/2018 | Rohrmüller | G01S 17/42 |
| 2018/0272958 A1 | 9/2018 | Brouwer et al. | |
| 2018/0284285 A1 | 10/2018 | Curatu | |
| 2018/0297538 A1* | 10/2018 | Koulas | B60R 19/483 |
| 2018/0345917 A1* | 12/2018 | Yamamoto | B60R 11/04 |
| 2018/0361997 A1* | 12/2018 | Schmidt | G01S 7/4813 |
| 2019/0003895 A1* | 1/2019 | Krishnan | B60S 1/481 |
| 2019/0054855 A1* | 2/2019 | Krishnan | B60Q 1/2661 |
| 2019/0068845 A1* | 2/2019 | Krishnan | B60S 1/52 |
| 2019/0077376 A1* | 3/2019 | Baldovino | B60S 1/52 |
| 2019/0077377 A1* | 3/2019 | Schmidt | B60S 1/52 |
| 2019/0099768 A1* | 4/2019 | Romack | B60S 1/56 |
| 2019/0118776 A1* | 4/2019 | Krishnan | G07C 5/008 |
| 2019/0184942 A1* | 6/2019 | Vaishnav | B08B 1/04 |
| 2019/0204426 A1* | 7/2019 | Vaishnav | B60S 1/56 |
| 2019/0210570 A1* | 7/2019 | Schmidt | G02B 27/0006 |
| 2019/0256054 A1* | 8/2019 | Turner | B60S 1/56 |
| 2019/0314865 A1* | 10/2019 | Sevak | G02B 27/0006 |
| 2019/0322245 A1* | 10/2019 | Kline | B60S 1/0848 |
| 2020/0001832 A1* | 1/2020 | Deane | B08B 3/02 |
| 2020/0001834 A1* | 1/2020 | Grasso | B60S 1/528 |
| 2020/0029488 A1 | 1/2020 | Bertucci et al. | |
| 2020/0033592 A1* | 1/2020 | Crespo | G02B 27/0006 |
| 2020/0064483 A1 | 2/2020 | Li et al. | |
| 2020/0114877 A1* | 4/2020 | Hu | B60S 1/0411 |
| 2020/0114881 A1* | 4/2020 | Yamauchi | F04B 11/0033 |
| 2020/0125112 A1 | 4/2020 | Mao et al. | |
| 2020/0180569 A1* | 6/2020 | Seo | B60Q 1/323 |
| 2020/0215988 A1 | 7/2020 | Jackson et al. | |
| 2020/0247367 A1* | 8/2020 | Sakai | B60S 1/52 |
| 2020/0298804 A1* | 9/2020 | Sykula | G01S 7/497 |
| 2020/0331496 A1 | 10/2020 | Cao et al. | |
| 2020/0391702 A1* | 12/2020 | Yamauchi | B60S 1/56 |
| 2020/0398795 A1* | 12/2020 | Sykula | G02B 27/0006 |
| 2020/0406835 A1 | 12/2020 | Shitara et al. | |
| 2020/0406864 A1* | 12/2020 | Sakai | B60S 1/56 |
| 2021/0025982 A1* | 1/2021 | Robertson, Jr. | G01S 7/497 |
| 2021/0031700 A1 | 2/2021 | Kitagawa et al. | |
| 2021/0061233 A1* | 3/2021 | Robertson, Jr. | G02B 27/0006 |
| 2021/0061237 A1* | 3/2021 | Krishnan | G01S 7/4813 |
| 2021/0094079 A1* | 4/2021 | Krishnan | B08B 5/02 |
| 2021/0101539 A1* | 4/2021 | Krishnan | E05F 15/73 |
| 2021/0146406 A1* | 5/2021 | Sykula | G01S 17/931 |
| 2021/0170995 A1* | 6/2021 | Zhuang | G02B 27/0006 |
| 2021/0179031 A1* | 6/2021 | Vitanov | H04N 23/811 |
| 2021/0179032 A1* | 6/2021 | Vitanov | H04N 5/2171 |
| 2021/0197769 A1* | 7/2021 | Shirakura | B60S 1/486 |
| 2021/0331651 A1* | 10/2021 | Baldovino | G01S 7/4813 |
| 2021/0339685 A1 | 11/2021 | Adams et al. | |
| 2021/0339699 A1 | 11/2021 | Adams et al. | |
| 2021/0341583 A1 | 11/2021 | Adams et al. | |
| 2021/0341613 A1 | 11/2021 | Adams et al. | |
| 2021/0362688 A1* | 11/2021 | Kawamura | B60S 1/54 |
| 2021/0400179 A1* | 12/2021 | Brown | G03B 17/55 |

FOREIGN PATENT DOCUMENTS

| | | |
|---|---|---|
| WO | WO2015141457 | 9/2015 |
| WO | WO2017169675 | 5/2017 |

OTHER PUBLICATIONS

Office Action for U.S. Appl. No. 16/864,109, dated Dec. 9, 2021, Adams, "Sensor Pod Coverage nd Placement on Vehicle" (24 pages).

Lopez, Jonathan, "This is Cruise Origin, GM's First Driverless Car", GM Authority, 2021, retrieved at <<https://gmauthority.com/blog/2020/01/this-is-cruise-origin-gms-first-driverless-car/>> (4 pages).

Office Action for U.S. Appl. No. 16/864,109, dated Mar. 30, 2021, Adams, "Sensor Pod Coverage and Placement on Vehicle", 18 pages.

Office Action for U.S. Appl. No. 16/864,138, dated Jul. 22, 2021, Adams, "Sensor Pod Calibration", 7 pages.

Office Action for U.S. Appl. No. 16/864,122, dated Aug. 16, 2021, Adams, "Pedestrian Protection System for Sensor Pods", 14 pages.

The PCT Search Report and Written Opinion dated Jul. 22, 2021 for PCT application No. PCT/US21/30321, 9 pages.

Office Action for U.S. Appl. No. 16/864,109, dated Jun. 20, 2022, Adams, "Sensor Pod Coverage and Placement on Vehicle", 27 Pages.

* cited by examiner

SENSOR POD CLEANING SYSTEM

BACKGROUND

Many vehicles in operation today are designed to perceive their surroundings using sensors. The sensors are often integrated into the vehicle, for example, in vehicle body panels. Integration into the vehicle body, however, often limits the field of view of the sensors. In other examples, sensors may be mounted to an exterior of a vehicle, such as on a roof of the vehicle. However, placement of the sensors on the exterior of the vehicle increases a likelihood of the sensor impacting an external object potentially causing damage to the sensor and/or the object impacted. These and other issues are complicated by the number and type of sensors to be included on the vehicle. While sensor technology is improving, compact, electric, bidirectional, and/or autonomous vehicles have unique components and configurations that, under certain conditions, conventional sensor systems may be insufficient to provide data to the vehicle during operation or may cause long delays while the sensors are replaced.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
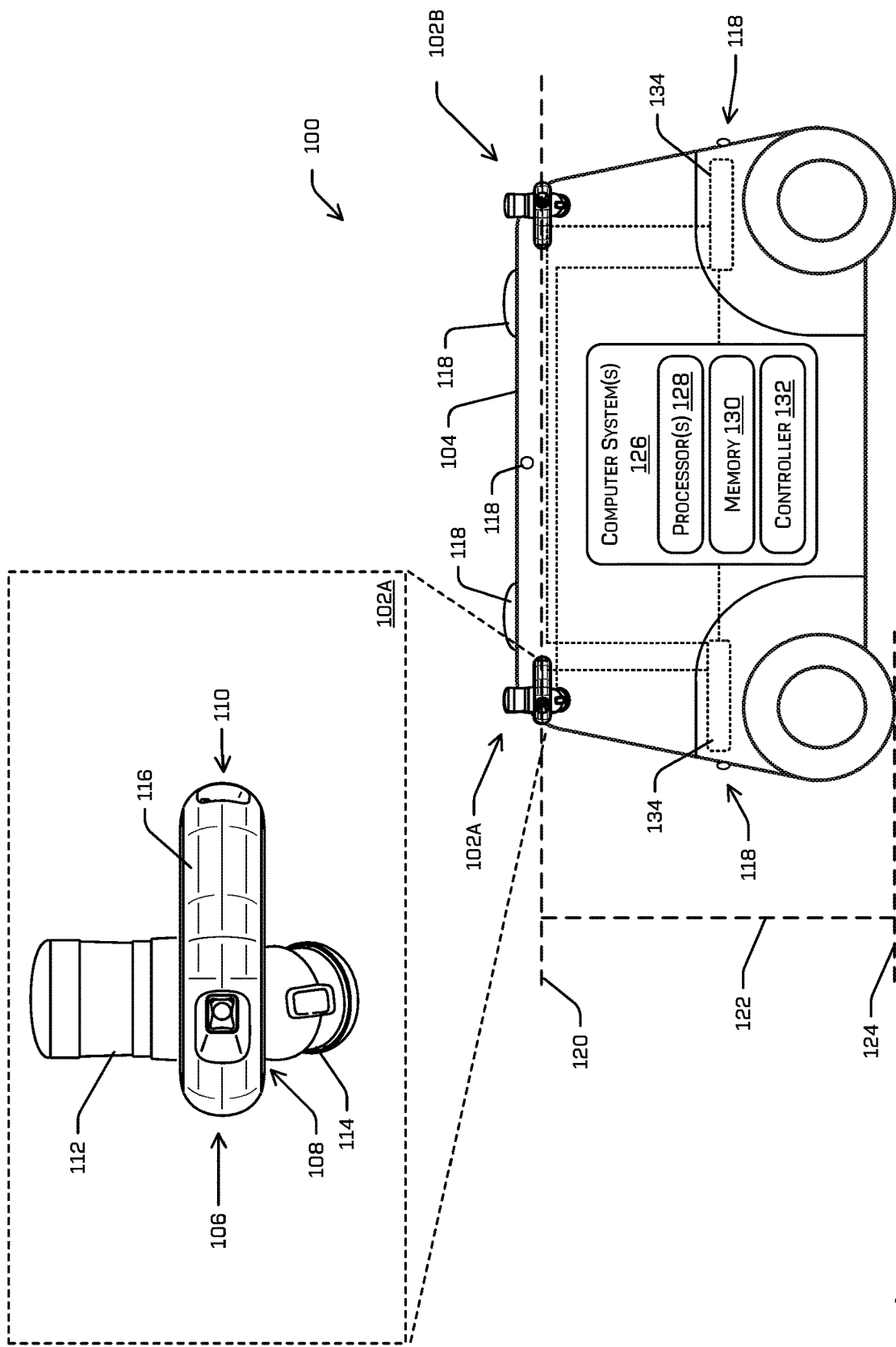
FIG. 1 is an illustration of an example vehicle having one or more sensor pods to collect and provide data to the autonomous vehicle, in accordance with examples of the disclosure.

As discussed above, conventional sensor placement integrated into the body of the vehicle may not provide sufficient sensor coverage, may be time consuming to replace. For example, for a sensor that is embedded within the body, for example, a body panel, the process to remove and replace the sensor often requires the removal of the body panel and/or other portions of the vehicle. This can be a relatively long and involved process preventing the vehicle to be in service. When sensors are mounted on the exterior of the vehicle, the sensors may impact an external object potentially causing damage to the sensor and/or the object impacted This application relates to structures and techniques for improving sensor placement, packaging, maintenance, and replacement, while providing protection to pedestrians. In examples, the sensors may be disposed in self-contained assemblies or "sensor pods" that are removably coupled to the vehicle. Multiple sensor pods, for example four, may be disposed around an exterior of the vehicle to provide coverage for an environment surrounding the vehicle.

For example, a sensor pod may include a frame comprising a mounting interface removably coupling the sensor pod to a vehicle. In examples, the sensor pod may include multiple sensors mounted to locations on the frame where each location provides the respective sensor a field of view that complements the fields of view of the other sensors in the sensor pod to create an effective field of view for each sensor pod. In examples, the sensor pod may have multiple sensor types. For example, several of the sensors may be imaging sensors, for example, cameras (e.g., RGB-cameras, monochrome cameras, intensity (grey scale) cameras, infrared cameras, ultraviolet cameras, depth cameras, stereo cameras, time-of flight (TOF) sensors, and the like), while other sensors may be ranging or distancing sensors, for example, a light detection and ranging (lidar) sensor, a radio detection and ranging (RADAR) sensor, one or more ultrasonic transducers, such as a sound navigation and ranging (SONAR) sensor, or another known sensor type. Other types of sensors, such as inertial measurement sensors, and the like may additionally or alternatively be included in the sensor pods. In examples, the sensors of the same type within the sensor pod may have different and/or overlapping fields of view to provide coverage for a portion of the environment surrounding the vehicle.

In examples, the frame may be cast and provide sensor locations through cast surfaces. In examples, the cast frame provides a rigid mount for the sensors, and spaces the sensors in the pod slightly away from the vehicle. The cast surfaces may provide mounting interfaces with sufficient accuracy without requiring a secondary process of machining the surfaces. Use of such mounting surfaces may, in some examples, reduce the computational resources required for calibration (e.g., by ensuring that the sensors are placed within some known tolerance) as well as by reducing the number of required calibrations by ensuring little to no movement when operating the vehicle.

In examples, the sensor pod may have a cleaning system with nozzles disposed adjacent to sensor surfaces to clean them. In examples, the nozzles may apply a pressurized fluid to clean the surfaces. In examples, the cleaning system may be fed by a centralized fluid reservoir that may supply multiple sensor pods. Fluid provided to a particular sensor pod may be distributed to a multiple sensors within the sensor pod via a fluid manifold.

In examples, the sensor pod has a supply harness that may connect the sensor pod to the vehicle. The supply harness may provide power and the pressurized fluid to the sensor pod. In examples, the sensor pod may also have a sensor harness electrically coupled to the vehicle and electrically coupled to the sensors to transmit sensor data from the sensors of the sensor pod to a computing system of the vehicle.

As discussed, in examples, the vehicle may have multiple sensor pods disposed on the body of the vehicle. For example, the vehicle may include a body having a first end and a second end distal to the first end along a longitudinal axis with a first sensor pod, removably coupled to the body at a first location. In examples, the first location is adjacent to the first end and spaced from the longitudinal axis in a first direction along a first transverse axis, at an elevation above a ground interface. In examples, the vehicle may include a second sensor pod, a third sensor pod, and a fourth sensor pod distributed around the body of the vehicle (e.g., proximate the four corners or quadrants of the vehicle). In examples, the first, second, third, and fourth sensor pods each have an effective sensor field of view. When mounted to the vehicle, a sensor pods effective sensor field of view overlaps with an adjacent sensor pods effective field of view. In examples, the overlapping fields of view allow the sensor pods to see around the entire vehicle. In examples, the overlapping fields of view provide sensor redundancy. For example, if a sensor pod is damaged or malfunctions, the other three sensor pods still provide an effective field of view to see around the entire vehicle. In examples, a sensor pod's effective field of view is at least 270 degrees. In examples, the elevation of the sensor pods may be high enough to avoid or see over a majority of obstacles commonly encountered while driving. In examples, the sensor pods may be mounted at an elevation of at least about 4 feet and at most about 7 feet above the ground. In some examples, the sensor pods may be mounted proximate to or slightly below a top of the vehicle. For instance, a mount of each sensor pod may be coupled to the vehicle within about 18 inches of a top of the vehicle, and the sensor pod may extend vertically above and/or below the mount location. In one particular example, a sensor pod may be mounted to a vehicle at about 5 feet and 10 inches above the ground. In examples, the sensor pods may extend above the top of the vehicle. In examples, the sensor pods may be mounted above the vehicle. In examples, the sensor pod is mounted at least 5'10" above the ground, but below one foot above the top of the vehicle body In examples, the sensor pod may include pedestrian protection systems. For example, the sensor pod may include a frame coupled to a vehicle, a sensor coupled to the frame and an impact structure coupled to the frame. In examples, the impact structure comprises an outer surface and an impact energy absorbing structure. The outer surface is configured to interface with a pedestrian or other object during an impact. At least a portion of the outer surface is disposed outboard of the sensor relative to the frame. The impact energy absorbing structure is disposed between the outer surface and frame and is configured to absorb a portion of energy transferred through the outer surface from the impact. In examples, the impact energy absorbing structure comprises a stress concentration zone, where the stress concentration zone causes local plastic deformation of the impact energy absorbing structure to absorb energy from the impact. In examples, the outer surface may be configured to move substantially uniformly during an impact. In examples, the outer surface may be configured to deflect up during impact to absorb some energy from the impact. In examples, the sensor pod may have another sensor disposed above the frame and coupled to the frame by a deformable fastener. In examples, the deformable fastener may deform during an impact to absorb energy from the impact. In examples, the deformable fastener may release the sensor if the energy from the impact exceeds a threshold. In examples, the sensor pod may include a baffle structure where the baffle structure contains crumple zones configured to plastically deform during an impact to absorb energy.

While certain examples are provided in the context of a vehicle having sensor pods disposed proximate four corners of the vehicle and at an elevation near a top surface of the vehicle, in other examples other numbers and configurations of sensor pods may be used and/or the sensor pods may be disposed at other locations (e.g., elevations, lateral spacing, and/or longitudinal spacing) relative to the vehicle. Additionally, while example sensor pods provided herein include particular combinations of sensors of multiple different types, in other examples, sensor pods incorporate fewer sensors of some types and additional sensors of other types. In other examples, sensor pods may include a larger number of some sensors disposed on the sensor pod to provide a desired resolution or redundancy.

Illustrative Autonomous Vehicle with Sensor Pods

FIG. 1 is an illustration of an example vehicle 100 having one or more sensor pod assemblies configured with multiple sensors to collect information about the surroundings of the autonomous vehicle, in accordance with examples of the disclosure. The vehicle shown in FIG. 1 is a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, the energy management structures described herein may be applicable to non-autonomous and/or non-bidirectional vehicles as well. Also, while examples are given in which the vehicle is a land vehicle, the techniques described herein are also applicable to aerial, marine, and other vehicles.

In the illustrated example, the vehicle 100 includes a first sensor pod assembly 102A and a second sensor pod assembly 102B (collectively "sensor pods 102") coupled to a body 104. Each of the sensor pod assemblies 102 in this example include multiple sensors and may include systems or structures to clean or protect the sensor pod or others during an impact. For example, the sensor pod assembly 102A includes a first sensor 106, a second sensor 108, and a third sensor 110. In some example, these sensors may be of a first type, for example, an imaging sensor. In some examples, the sensor pod assembly 102A also includes a fourth sensor 112 and a fifth sensor 114. In some examples, these sensors may be of a second type, for example a light detection and ranging (lidar) sensor.

In some examples, the sensor pod 102A also has an outer shell 116 or trim. In some examples the outer shell 116 incorporates an energy absorbing structure that may mitigate damage to an object that impacts the sensor pod assembly 102A.

In some examples, the body 104 has additional sensors 118 disposed on the body 104 away from the sensor pod assemblies 102.

In some examples, the vehicle 100 may have a longitudinal axis 120 running the length of the vehicle 100. In some examples, the sensor pod assembly 102A may be disposed on the body 104 at an elevation 122 above a ground interface 124. In some examples, the sensor pod assembly 102A may be located at a height or elevation on the vehicle such that the sensors of the sensor pod assembly are able to see over most obstacles that the vehicle may encounter. For example, it may be advantageous to see over an obstacle allowing the vehicle's system to observe and react to not only the obstacle, but also observe and react to any additional obstacle or condition beyond the obstacle. In some examples, it is advantageous to observe an obstacle from an elevated angle where the elevated angle may allow the vehicle's system to better determine one or more of a distance, a closing rate, a status, a direction, among others.

In examples, the sensor pod 102A is mounted at an elevation of at least about 4 feet and at most about 7 feet above the ground. In examples, the sensor pod 102A is mounted proximate to or slightly below a top of the vehicle. For instance, a mount for a sensor pod may be coupled to the vehicle within about 18 inches of a top of the vehicle, and the sensor pod 102A may extend vertically above and/or below the mount location. In one particular example, the sensor pod 102A is mounted to the vehicle at about 5 feet and 10 inches above the ground. In examples, the sensor pod 102A extends above the top of the vehicle. In examples, the sensor pod 102A is mounted above the vehicle. In examples, the sensor pod 102A is mounted at least 5'10" above the ground, but below one foot above the top of the vehicle body.

In some examples, the sensor pod may be mounted to be greater than five feet above the ground. In some examples, the sensor pod may be mounted to be greater than five feet six inches above the ground. In some examples, the sensor pod may be mounted to be greater than five feet ten inches above the ground. In some examples, the sensor pod may be mounted to be greater than six feet above the ground. In some examples, the sensor pod may be mounted to be greater than six feet six inches above the ground. In some examples, the sensor pod may be mounted to be greater than seven feet above the ground.

In some examples, the sensor pod assembly is mounted below an elevation threshold. In some examples, it may be beneficial to have the sensors elevated, it may also be beneficial to have the sensor pod assembly to be mounted below an elevation. For example, if mounted too high, the sensor pod assembly may be at risk of impacting overhead obstacles such as trees, signs, bridges, overpasses, wires, cabling, among others. In some examples, if mounted too high, the sensor pod assembly may require additional support to provide sufficient stiffness or rigidity to reduce sway or amplified vibrations. In some examples, the sensor pod may be mounted to be less than two feet above a roof of the vehicle. In some examples, the sensor pod may be mounted to be less than 18 inches above the roof of the vehicle. In some examples, the sensor pod may be mounted to be less than one foot above the roof of the vehicle. In some examples, the sensor pod may be mounted to be less than six inches above the roof of the vehicle. In some examples, the sensor pod may be mounted to be substantially flush with the roof of the vehicle. In some examples, the sensor pod may be mounted to be below the roof of the vehicle.

The vehicle 100 in this example includes one or more computer systems 126 to control operation of one or more systems of the vehicle 100. For instance, in the case of an autonomous vehicle, the computer system(s) 126 may include one or more processors and memory and may be configured to control the vehicle 100 to, among other things, receive and process sensor data from one or more sensors and to plan a route for the vehicle through an environment.

In some examples, the computer systems 126 controls operation of one or more systems of the vehicle 100. For instance, in the case of an autonomous vehicle, the computer system(s) 126 may include one or more processor(s) 128 and memory 130 communicatively coupled with the one or more processor(s) 128 and may be configured to control the vehicle 100 to, among other things, receive and process sensor data from one or more sensors and to plan a route for the vehicle through an environment. In some examples, the computer system 126 may also include controller 132 configured to control subsystems of the vehicle 100. For example, controller 132 may control a sensor cleaning system 134. In some examples, cleaning system 134 may comprise a reservoir, fluid, pressuring, a pump, valves and may be connected to one or more of the sensor pods 102. In examples, the vehicle 100 comprises multiple cleaning systems 134. In examples, each of the cleaning systems 134 are coupled to one or more of the sensor pods 102. In examples, one of the multiple cleaning systems 134 is coupled to a first subset of the sensor pods 102, for example, including the sensor pod 102A, and another of the multiple cleaning systems 134 is coupled to a second subset of the sensor pods 102, for example, including sensor pod 102B. In examples, the first and second subsets of the sensor pods 102 are distinct. For example the cleaning system 134 that is coupled to the sensor pod 102A would not directly provide cleaning functions to the sensor pod 102B. In examples, the first and second subsets of the sensor pods 102 partially overlap. In examples, the first and second subsets of the sensor pods 102 completely overlap. For example, the multiple cleaning systems 134 provide redundancy to each other. In some examples, the cleaning system 134 is located within the body 104. In some examples, the cleaning system 134 is disposed within a detachable portion of the vehicle 100, for example, a drive module.

In the illustrated example, the vehicle 100 is an autonomous vehicle; however, the vehicle 100 could be any other type of vehicle, such as a semi-autonomous vehicle, or any other system having at least an image capture device (e.g., a camera enabled smartphone). Though depicted in FIG. 1 as residing in the body 104 for illustrative purposes, it is contemplated that the computer systems 126 be accessible to the vehicle 100 (e.g., stored on, or otherwise accessible by, memory remote from the vehicle 100, such as, for example, on memory of a remote computer device). In some examples, multiple computer systems 126 may be included on the vehicle 100. In some examples, computer systems 126 may be located within the body 104, a drive assembly, or combinations thereof.

The processor(s) 128 of the vehicle 100 may be any suitable processor capable of executing instructions to process data and perform operations as described herein. By way of example and not limitation, the processor(s) 128 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 130 is an example of non-transitory computer-readable media. Memory 130 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 130 may include at least a working memory and a storage memory. For example, the working memory may be a high-speed memory of limited capacity (e.g., cache memory) that is used for storing data to be operated on by the processor(s) 128. In some instances, memory 130 may include a storage memory that may be a lower-speed memory of relatively large capacity that is used for long-term storage of data. In some cases, the processor(s) 128 cannot operate directly on data that is stored in the storage memory, and data may need to be loaded into a working memory for performing operations based on the data, as discussed herein.

Figure 2:
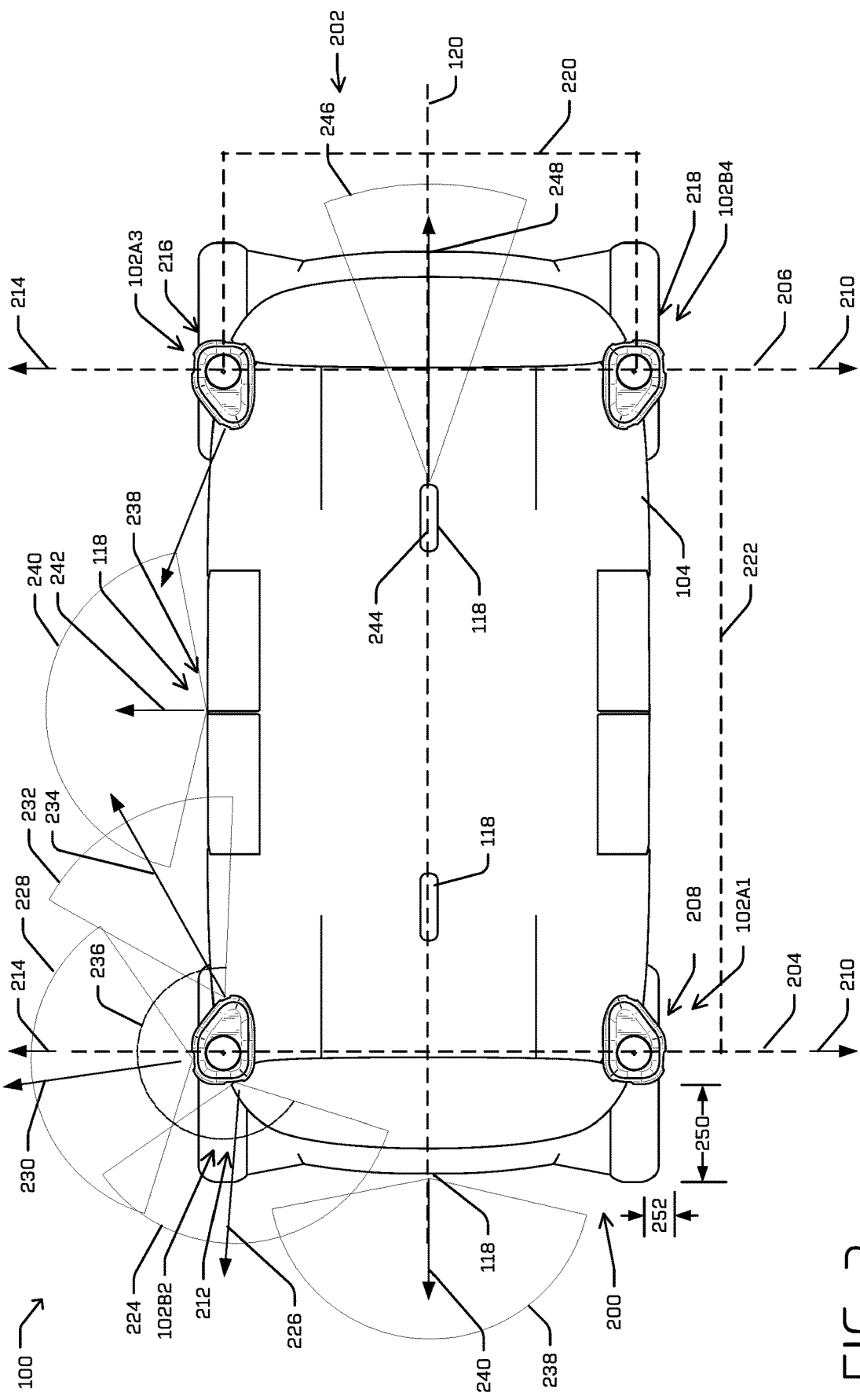
FIG. 2 is a top view of the example vehicle of FIG. 1 with sensor pods, in accordance with examples of the disclosure.

FIG. 2 shows the vehicle 100 of FIG. 1 from a top down view. In the illustrated example, the vehicle 100 includes a first sensor pod assembly 102A1, a second sensor pod assembly 102B2, a third sensor pod assembly 102A3, and a fourth sensor pod assembly 102B4 (collectively "sensor pods 102") coupled to the body 104. FIG. 2 also shows sensors 118 disposed on the vehicle away from the sensor pods 102. FIG. 2 shows the longitudinal axis 120 running the length of the vehicle 100 where the vehicle has a first end 200 and a second end 202 distal to the first end along the longitudinal axis 120. FIG. 2 shows a first transverse axis 204 at the first end 200 and a second transverse axis 206 at the second end 202.

FIG. 2 shows the first sensor pod assembly 102A1 removably mounted to the vehicle 100 at a first position 208 located adjacent to the first end 200 and spaced from the longitudinal axis in a first direction 210 along the first transverse axis 204. FIG. 2 shows the second sensor pod assembly 102B2 removably mounted to the vehicle at a second location 212 located adjacent to the first end 200 spaced from the longitudinal axis 120 in a second direction 214, opposite the first direction 210 along the first transverse axis 204. FIG. 2 shows the third sensor pod assembly 102A3 removably mounted to the vehicle at a third location 216 located adjacent to the second end 202 spaced from the longitudinal axis 120 in the first direction 210 along the second transverse axis 206. FIG. 2 shows the fourth sensor pod assembly 102B4 removably mounted to the vehicle at a fourth location 218 located adjacent to the second end 202 spaced from the longitudinal axis 120 in the first direction 210 along the second transverse axis 206.

In some examples, the sensor pods 102 may be spaced from each other along the first or second transverse axis by a distance 220 of 50 inches, 60 inches, or 70 inches. In some examples, the sensor pods 102 may be spaced from each other along the first or second transverse axis and stay within 2 inches of the exterior of the body 104, within 5 inches of the exterior of the body 104, within 8 inches of the exterior, within 10 inches of the exterior of the body 104, or within 12 inches of the exterior of the body 104.

In some examples, the sensor pods 102 may be spaced from each other along the longitudinal axis 120 by a distance 222 of 100 inches, 110 inches, or 120 inches. In some examples, the sensor pods 102 may be spaced from each other along the longitudinal axis 120 and stay within 2 inches of the exterior of the body 104, within 5 inches of the exterior of the body 104, within 8 inches of the exterior, within 10 inches of the exterior of the body 104, or within 12 inches of the exterior of the body 104.

In some examples, the sensor pods 102 have multiple sensors with each individual sensor having a sensor field of view. In some examples, the individual sensor's field of view may be combined to create an effective sensor field of view of the sensor pod. FIG. 2 shows illustrative sensor fields of view of individual sensors of sensor pods 102 For example, the sensor pod assembly 102B2 has a first sensor field of view 224 with an optical axis 226, a second sensor field of view 228 with an optical axis 230, and a third sensor field of view 232 with an optical axis 234. In examples, these sensor fields of view may be combined to create the sensor pod assembly's effective field of view 236. In examples, the first sensor field of view 224 is approximately, 80 degrees. In examples, the first sensor field of view 224 is between 75 and 85 degrees. In examples, the first sensor field of view 224 is between 60 and 90 degrees. In examples, the second sensor field of view 228 is approximately, 80 degrees. In examples, the second sensor field of view 228 is between 75 and 85 degrees. In examples, the second sensor field of view 228 is between 60 and 90 degrees.

In examples, the third sensor field of view 232 is approximately, 60 degrees. In examples, the third sensor field of view 232 is between 60 and 65 degrees. In examples, the third sensor field of view 232 is between 50 and 90 degrees.

In examples, the optical axis 226 is substantially parallel to longitudinal axis 120. In examples, the optical axis 226 is angled away from longitudinal axis 120. For example, the optical axis 226 is angled approximately 5 degrees outward from longitudinal axis 120. In examples, the optical axis 226 is angled between 2 and 10 degrees outward from longitudinal axis 120. In examples, the optical axis 226 is angled approximately 5 degrees inward from longitudinal axis 120. In examples, the optical axis 226 is angled between 2 and 10 degrees inward from longitudinal axis 120. In examples, where the optical axis 226 is angled inward or outward from the longitudinal axis 120, the chances of both sensors of two adjacent sensor pods directed at the same end of the vehicle experiencing sun blindness is greatly reduced. For example, the lens surfaces of both sensors would not be parallel and would not receive the sunlight at the same angle.

FIG. 2 also shows the sensors 118 having a sensor field of view. In examples, the sensors 118 may be similar to other sensors 118. In examples, the sensors 118 may have different characteristics and/or features. For example, a sensor 118 may be sensor 238 and have a sensor field of view 240 with an optical axis 242. In examples, a sensor 118 may be sensor 244 and have a sensor field of view 246 with an optical axis 248. In examples, the sensor field of view 240 may be greater than the sensor field of view 246. For example, the sensor 244 may provide a relatively narrow field of view when compared to the sensor 238. In examples, the sensor 244 may provide greater information about a location further from the vehicle 100 along optical axis 248. As a practical example, the sensor 244 may provide information about a condition further down a direction of travel. In examples, the sensor field of view 240 is between 140 degrees and 170 degrees. In examples, the sensor field of view 246 is approximately 30 degrees.

In some examples, the sensor pods 102 may be spaced from outside edges of the vehicle 100. For example, FIG. 2 shows the sensor pod 102A1 spaced a distance 250 back from the foremost portion of the body 104, for example, a fender, a grill, or other exterior surface. In examples, the distance 250 is approximately 285 mm. In examples, the distance 250 is between 200 mm and 300 mm. In examples, the distance 250 is between 50 mm and 200 mm. In examples, the distance 250 is between 0 mm and 50 mm. In examples, the distance 250 is negative. For example, the distance 250 is between −1 mm and −100 mm. In this example, a surface of the sensor pod would extend beyond the foremost portion of foremost portion of the body 104.

FIG. 2 also shows the sensor pod 102A1 spaced a distance 252 from the lateral most portion of the body 104, for example, a fender, a door, or other exterior surface. In examples, the distance 252 is approximately 10 mm. In examples, the distance 252 is between 0 mm and 10 mm. In examples, the distance 252 is negative. For example, the distance 252 is between −1 mm and −20 mm. In this example, a surface of the lateral most portion of the body 104 would extend beyond the sensor pod. In examples, the distance 252 is approximately −12 mm.

Figure 3:
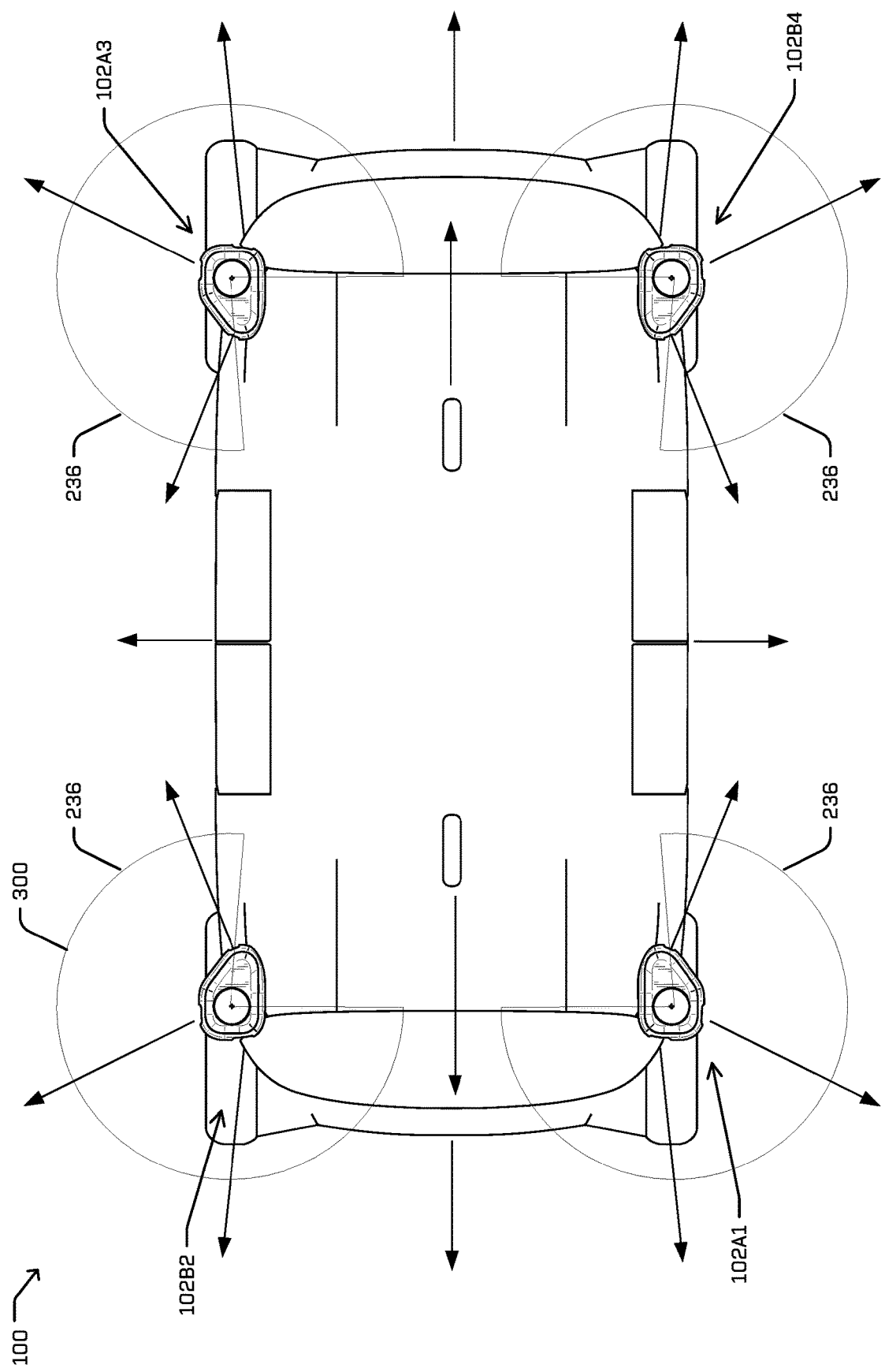
FIG. 3 is a simplified illustration of FIG. 2 showing fields of view and optical axis of the sensor pods.

FIG. 3 shows the vehicle 100 of FIGS. 1 and 2. In the illustrated example, the vehicle 100 includes the first sensor pod assembly 102A1, a second sensor pod assembly 102B2, a third sensor pod assembly 102A3, and a fourth sensor pod assembly 102B4 (collectively "sensor pods 102") coupled to the body 104. FIG. 3 also shows the optical axes of sensors of the sensor pods as well as the sensor pod's effective field of view 236 for each of the sensor pods 102. In examples, the sensor pods 102 have additional sensors. For example, a sensor pod 102 may have a lidar sensor with a second sensor type field of view 300. In examples, the second sensor type field of view may cover the same or substantially similar fields of view.

In some examples, the effective sensor field of view 236 of the first sensor pod assembly 102A1 overlaps with a least a portion of the effective sensor field of view 236 of the second sensor pod assembly 102B2 and with at least a portion of the effective sensor field of view 236 of the fourth sensor pod assembly 102B4. In some examples, the effective sensor field of view 236 of the second sensor pod assembly 102B2 overlaps with a least a portion of the effective sensor field of view 236 of the first sensor pod assembly 102A1 and with at least a portion of the effective sensor field of view 236 of the third sensor pod assembly 102A3. In some examples, the effective sensor field of view 236 of the third sensor pod assembly 102A3 overlaps with a least a portion of the effective sensor field of view 236 of the second sensor pod assembly 102B2 and with at least a portion of the effective sensor field of view 236 of the fourth sensor pod assembly 102B4. In some examples, the effective sensor field of view 236 of the fourth sensor pod assembly 102B4 overlaps with a least a portion of the effective sensor field of view 236 of the first sensor pod 102A1 and with at least a portion of the effective sensor field of view 236 of the third sensor pod assembly 102A3.

In examples, the effective sensor pod field of view may be 270 degrees or greater. In examples, the effective sensor fields of view of adjacent sensor pod assemblies overlap at a distance from the vehicle. For example, the distance may be five feet, two feet, or one foot. In examples, the distance is zero meaning the sensor fields of view overlap at the vehicle or negative meaning the sensor fields of view overlap on the vehicle. In examples, this creates an effective system field of view of sensor pods of 360 degrees allowing coverage around the vehicle. In examples, the overlap is such that the effective system field of view of sensor pods is 360 degrees even with three of the four sensor pods active. In examples, the overlap is such that the effective system field of view of sensor pods is 360 degrees even with two of the four sensor pods active if the two active sensor pods are on opposite corners or in opposite quadrants of the vehicle.

In examples, the sensor pods 102 extend from the body 104. For example, each sensor pod protrudes at least a first distance from a longitudinal end and at least second distance from a lateral side of the body 104 of the vehicle 100. In examples, the first and second distances may be the same or different. In examples, the first and second distance may be zero inches, two inches, six inches, eight inches, ten inches, twelve inches, or greater.

In examples, the sensor pods 102 are located in different quadrants, for example, near the corners of the vehicle. By being near an extremity of the vehicle, the sensor pods may have an advantageous viewing perspective in some situations. For example, when turning a corner or pulling out from a parking spot, the sensor pod may be able to see around the corner to collect data before the full vehicle enters the space. In examples, the sensor pods 102 are located at the first, second, third, and fourth locations on the vehicle. For example, the first location is within a first distance of the first end and the spacing from the longitudinal axis of the first location is greater than a second distance from the longitudinal axis such that the effective sensor field of view of the first sensor pod includes a view of an object behind an obstacle located at a first position relative to and away from the vehicle.

In examples, the sensor field of view 300 may be limited to an amount less than 360 degrees for an individual sensor. For example, the sensor field of view may be greater than 270 degrees, approximately 270 degrees, or less than 270 degrees. In examples, where the field of view for certain types of sensors may be beneficial to data collection and computing efficiency. For example, by placing the sensors near the corners of the vehicle, the 270 degrees of field of view allows for a full 360-degree view when combined with other sensors while also retaining redundancy from the overlapping fields of view. However, by limiting the field of view of the sensor, unnecessary data of the unchanging parts of the vehicle is either not collected or efficiently filtered out of the data early in processing reducing the load on the system. In examples, viewing portions of the vehicle may be beneficial, the field of view may be limited to be below a vehicle content threshold.

In examples, the sensor pods 102 has two configurations or types. For example a first type of sensor pod may be a mirror image of a second type of sensor pod. FIG. 3 shows an example where sensor pod assembly 102A1 and 102A3 are of a first type, while sensor pod assembly 102B2 and 102B4 are of a second type.

Figure 4:
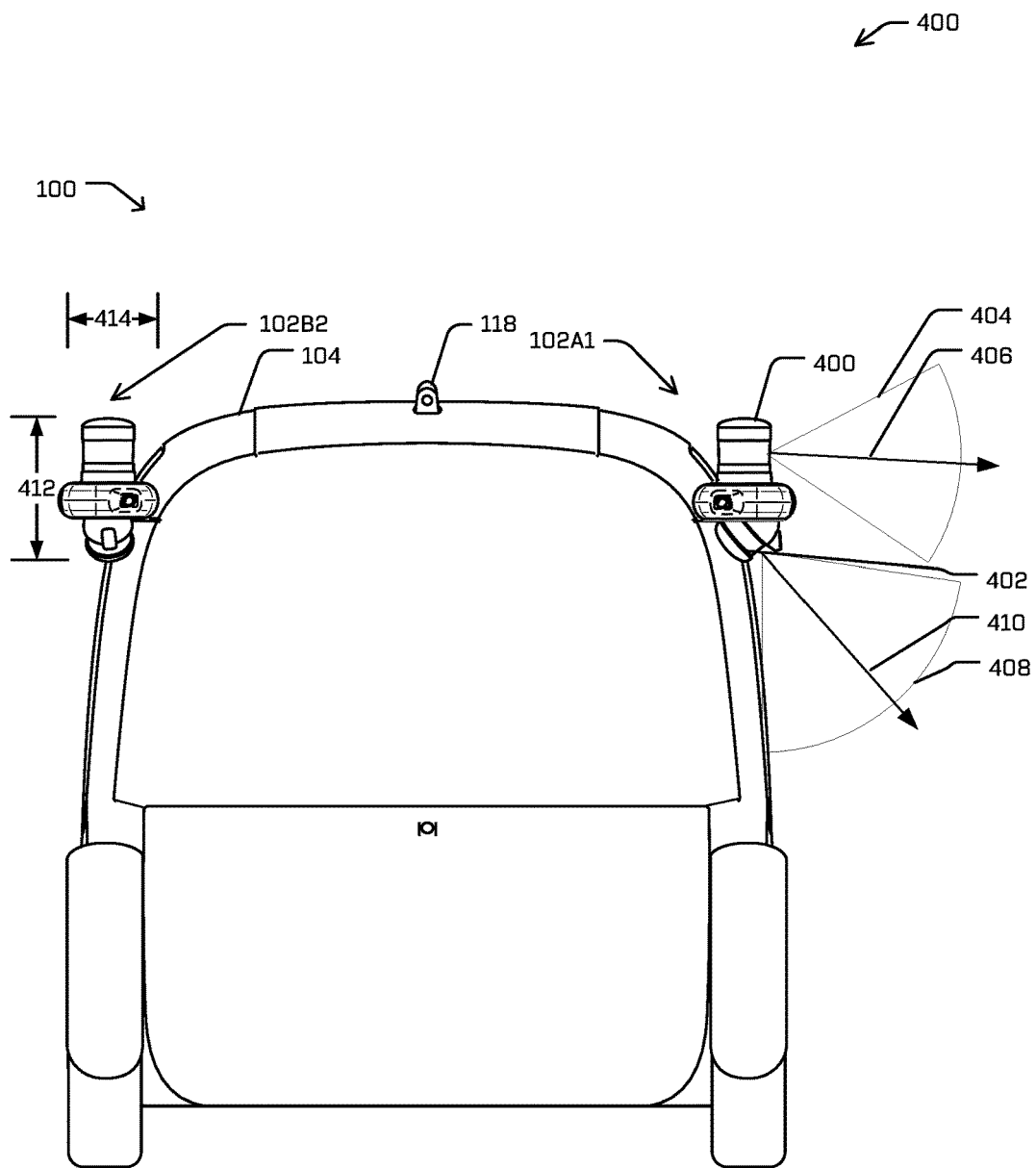
FIG. 4 is an end view of the example vehicle shown in FIGS. 1-3.

FIG. 4 shows the vehicle 100 of FIGS. 1-3 from an end view. In the illustrated example, the vehicle 100 includes the first sensor pod assembly 102A1. The discussion of fields of view of sensors has noted the coverage in a planar view for simplicity with vertical coverage across those fields of view inherently included. FIG. 4 shows an example where sensors of the sensor pods 102 may be oriented within the sensor pod to modify the vertical orientation. In examples, a first sensor 400 and a second sensor 402 of the sensor pod assembly 102A1 have fields of view and a sensing axis. For example, the first sensor 400 may have a field of view 404 and a sensing axis 406, and sensor 402 may have a field of view 408 and a sensing axis 410. In this example, the sensing axis 406 may be substantially horizontal with respect to the vehicle 100 while the sensing axis 410 may be angled down, for example, at 45 degrees. In examples, the field of view 404 of the first sensor 400 may provide a view of objects further from the vehicle when compared to the field of view 408 of the second sensor 402 which may provide a view of objects closer to the vehicle. In examples, the second sensor 402 may provide useful information when the vehicle is operating close to object, for example, when parking or maneuvering near people or objects.

FIG. 4 also shows a second sensor pod assembly 102B2. In examples, the sensor pod 102B2 is similar to sensor pod 102A1. In examples, the sensor pod 102B2 has a mirrored layout when compared to sensor pod 102A1. In examples, sensor pod 102B2 has a height 412 and a width 414. In examples, the height 412 may be approximately, 330 mm. In examples, the height 412 may be between 300 mm and 350 mm. In examples, the height 412 may be between 275 mm and 375 mm.

In examples, the width 414 may be approximately, 230 mm. In examples, the width 414 may be between 200 mm and 250 mm. In examples, the width 414 may be between 175 mm and 175 mm.

Illustrative Sensor Pod Assembly

Figure 5:
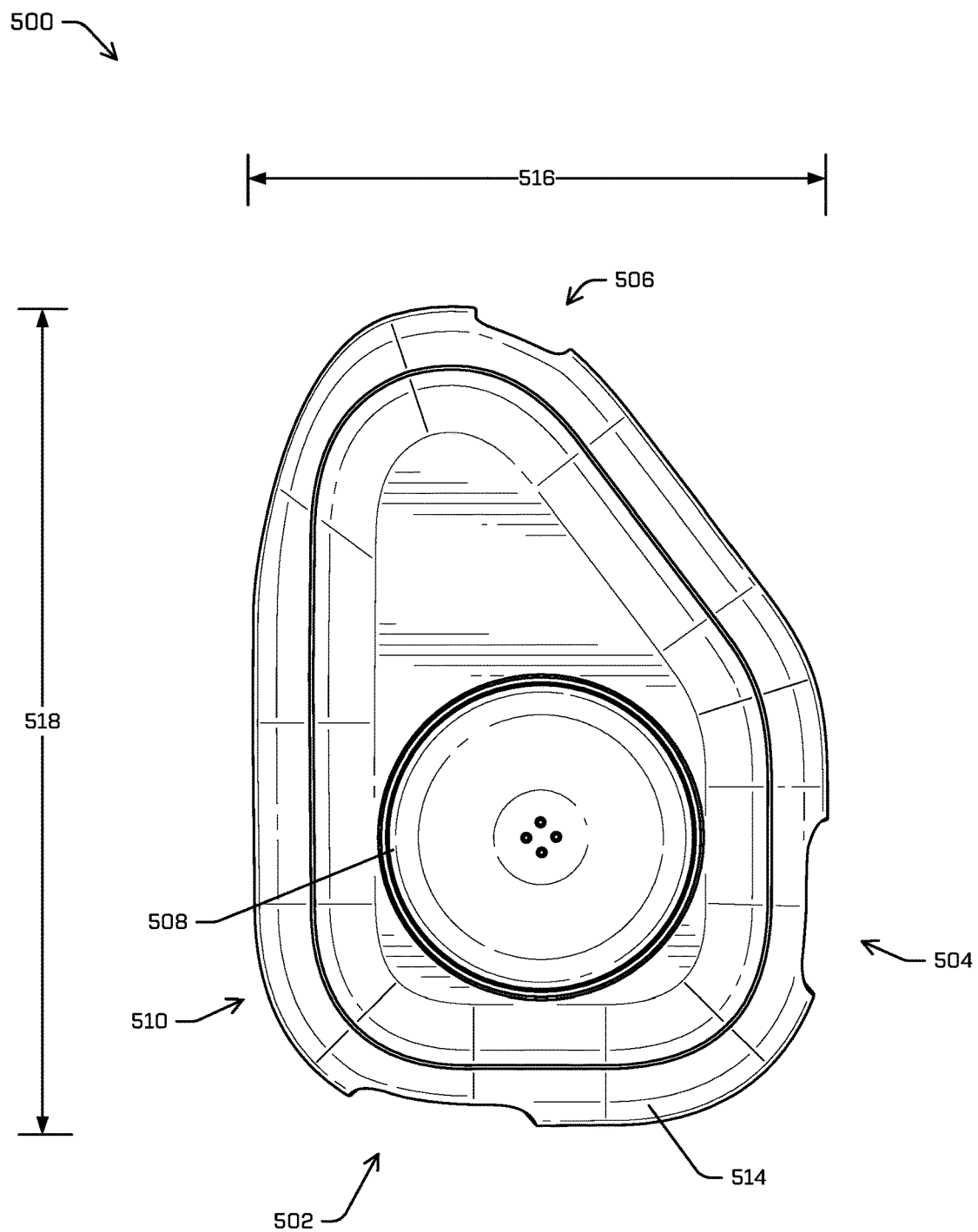
FIG. 5 is a top view of an example sensor pod, in accordance with examples of the disclosure.

FIG. 5 shows a top down view of an illustrative sensor pod 500. In examples, the sensor pod 500 includes a first sensor 502, a second sensor 504, and a third sensor 506. In some example, these sensors may be of a first type, for example, an imaging sensor. In some examples, the sensor pod 500 also includes a fourth sensor 508 and a fifth sensor 510 (below). In some examples, these sensors may be of a second type, for example a light detection and ranging (lidar) sensor.

In examples, the sensor pod 500 also has an outer shell 514 or trim. In examples the outer shell 514 incorporates an energy absorbing structure that may mitigate damage to an object that impacts the sensor pod 500.

In examples, the sensor pod 500 is similar to sensor pod 102B2 shown in FIG. 4. In examples, sensor pod 500 has a width 516 and a length 518. In examples, the width 516 is similar the width 414 shown in FIG. 4. In examples, the width 516 may be approximately, 230 mm. In examples, the width 516 may be between 200 mm and 250 mm. In examples, the width 516 may be between 175 mm and 175 mm.

In examples, the length 518 may be approximately, 300 mm. In examples, the length 518 may be between 250 mm and 350 mm. In examples, the length 518 may be between 225 mm and 375 mm.

In examples, 412 and a width 414. In examples, the height 412 may be approximately, 330 mm. In examples, the height 412 may be between 300 mm and 350 mm. In examples, the height 412 may be between 275 mm and 375 mm.

Figure 6:
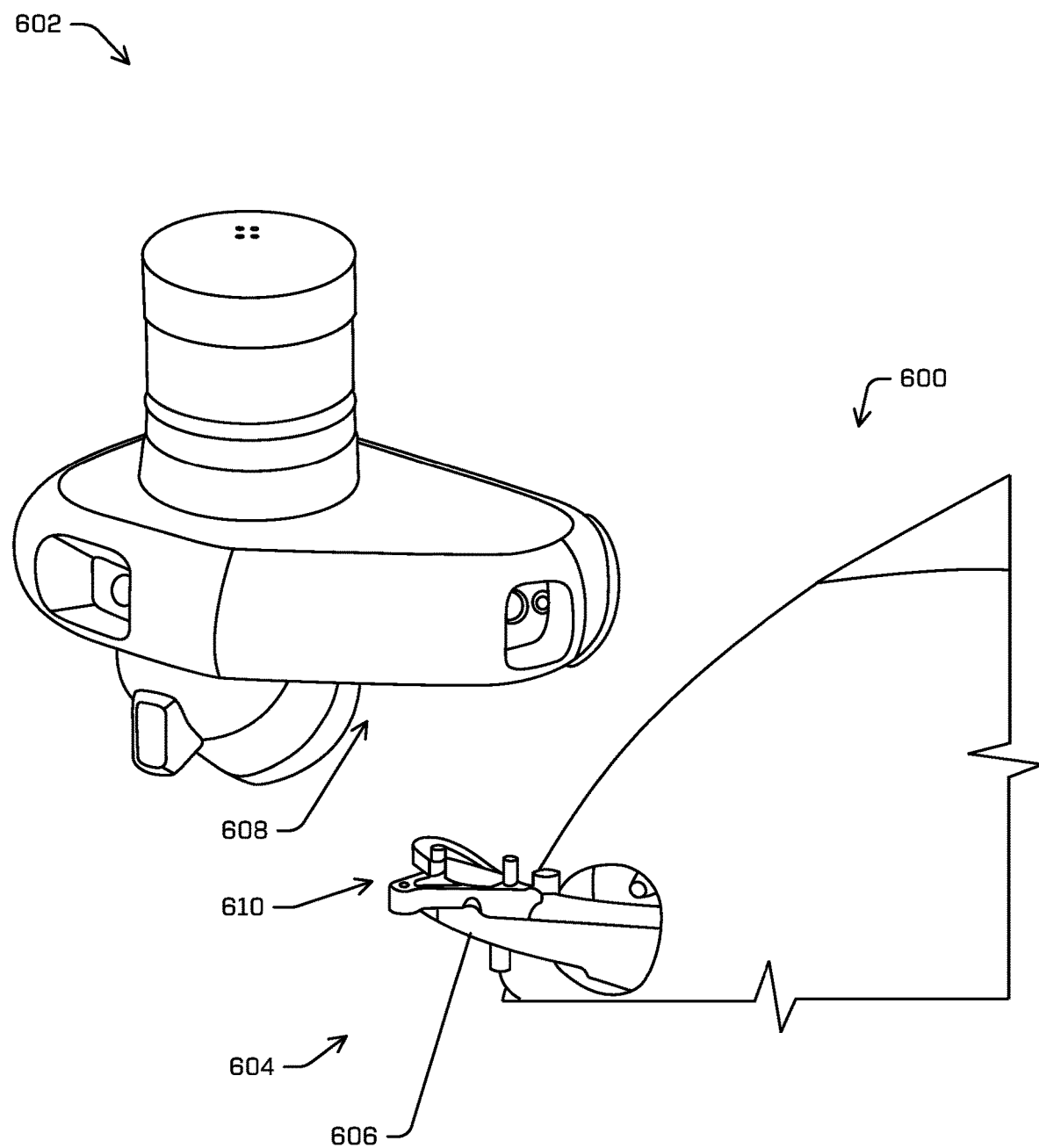
FIG. 6 is a perspective view of a sensor pod detached from an illustrative vehicle mount, in accordance with examples of the disclosure.

FIG. 6 shows a perspective view of an illustrative example of a vehicle 600 where a sensor pod 602 is mounted to the vehicle 600. In examples, the sensor pod 602 may be mounted to the vehicle 600 through a mounting system 604. In examples, a mounting arm 606 may be coupled to the vehicle in a rigid and permanent configuration. The sensor pod 602 may be mounted to the mounting arm 606 through a mounting interface 608 on the sensor pod 602. In examples, the mounting arm and mounting interface 608 have indexing features 610 to increase accuracy and consistency of the orientation of sensor pod 602 and sensors relative to the vehicle 600 when installing and removing the sensor pod 602.

Figure 7:
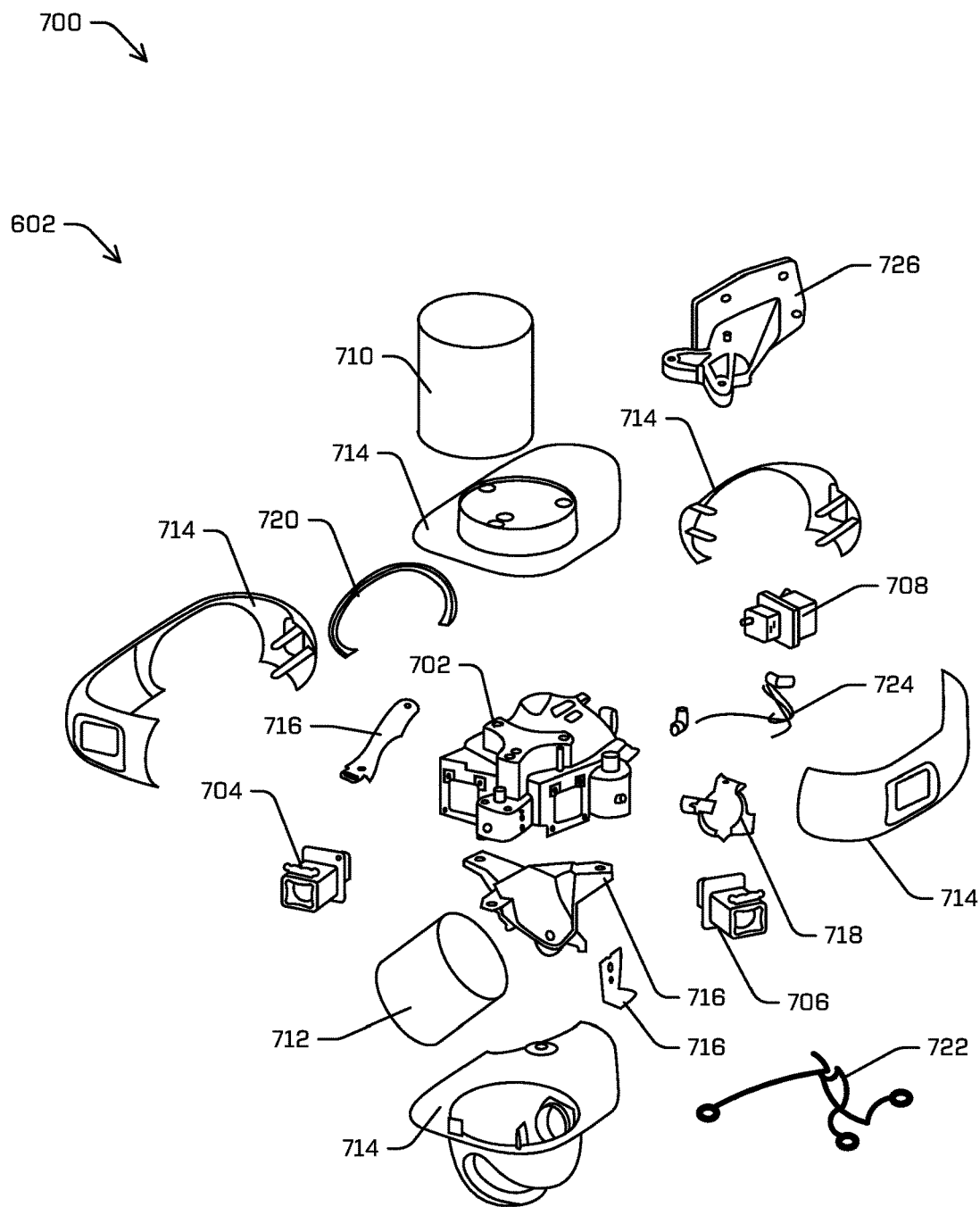
FIG. 7 is an exploded view of an illustrative sensor pod, in accordance with examples of the disclosure.

FIG. 7 is an exploded view 700 of sensor pod 602. In examples, the sensor pod 602 includes a frame 702 with various sensors, for example, a first camera 704, a second camera 706, a third camera 708, a first lidar 710, and a second lidar 712. Sensor pod 602 may also include exterior trim 714, brackets 716, a puddle lamp 718, seals 720, cleaning system 722, and harnesses 724.

The exploded view 700 also shows a pod arm 726. In examples, the pod arm 726 would be attached to a vehicle to which the sensor pod 602 could later be attached.

Figure 8:
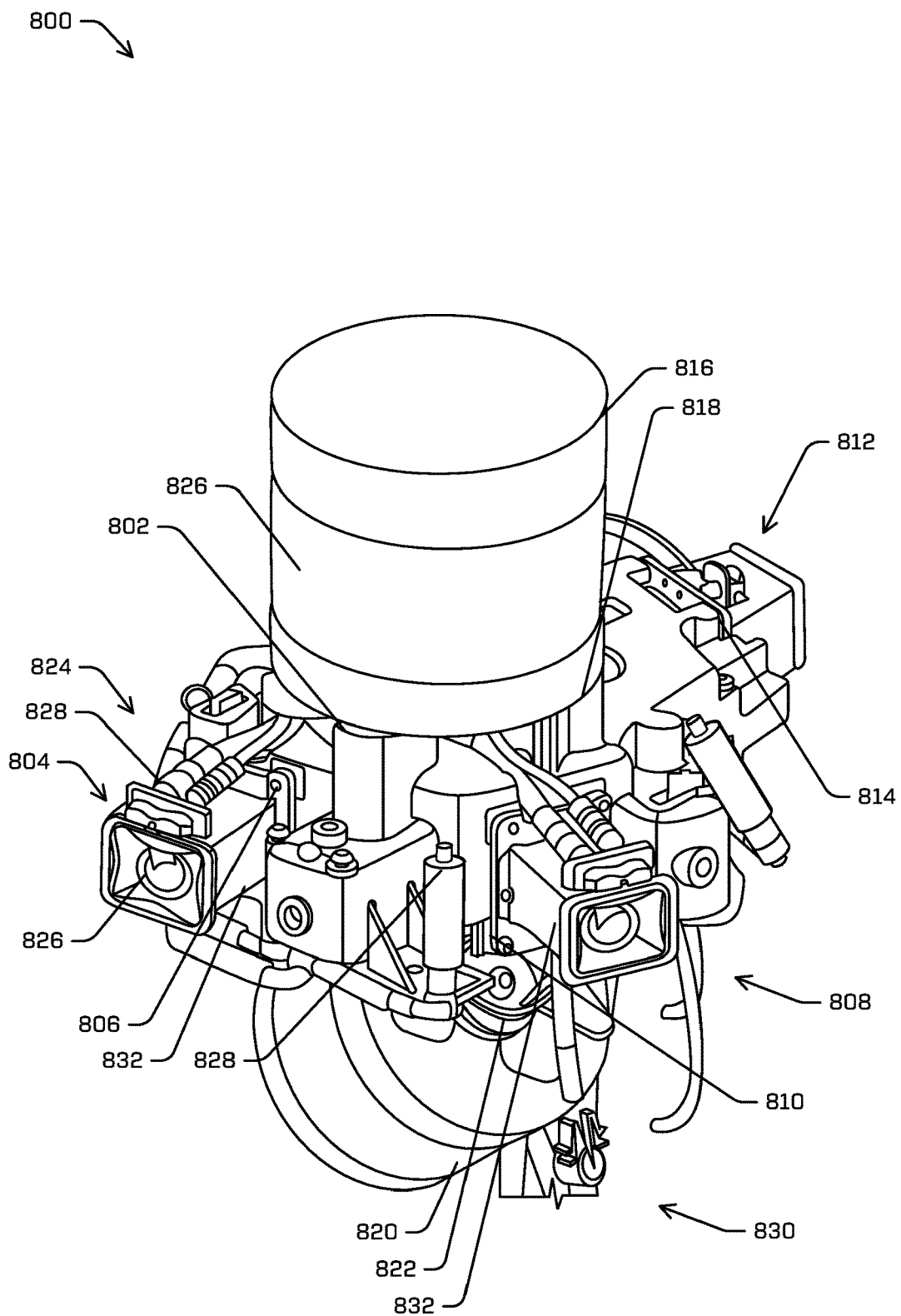
FIG. 8 is a perspective view of a sensor pod with an external housing removed to show internal components, in accordance with examples of the disclosure.

FIG. 8 shows a sensor pod 800 without an outer shell or trim. In examples, sensor pod 800 includes a frame 802 with a mounting interface (not shown) that may mount the sensor pod 800 to a vehicle (not shown). In examples, the sensor pod 800 includes a first sensor 804 removably mounted to a first location 806 of the frame 802, where the first sensor 804 has a first field of view. In examples, the sensor pod 800 also includes a second sensor 808 having a second field of view, mounted to a second location 810 of the frame 802, where the second location 810 is orientated relative to the first location 806 to cause at least a portion of the first field of view to overlap with at least a portion of the second field of view. An example of this may be see in FIG. 2. In examples, the sensor pod 800 also includes a third sensor 812 having a third field of view, mounted to a third location 814 of the frame 802, where the third location 814 is orientated relative to the first location 806 and the second location 810 to cause at least a portion of the second field of view to overlap with at least a portion of the third field of view. In examples, the sensor pod 800 also includes a fourth sensor 816 removably mounted to a fourth location 818 of the frame 802, where the fourth sensor 816 has a fourth field of view. In this example, the fourth location 818 is orientated relative to the first location 806 to cause at least a portion of the first field of view to overlap with at least a portion of the fourth field of view, In examples, the sensor pod 800 also includes a fifth sensor 820 having a fifth field of view, mounted to a fifth location 822 of the frame. In this example, the fifth location 822 is orientated relative to the frame 802 to cause at least a portion of the fourth field of view to overlap with at least a portion of the fifth field of view.

In examples, the first sensor 804, the second sensor 808, and the third sensor 812 are of a first type and the fourth sensor 816 and fifth sensor 820 are of a second type. In examples, the first type of sensor is an imaging sensor, for example, a camera. In examples, the second type of sensor is a lidar sensor. In examples, the fields of view for a type of sensor may be the same or may be different. For example, the field of view of the first sensor 804 may be different from the field of view of the third sensor 812. In examples, the field of view of the third sensor 812 is the same as the field of view of the first sensor 804 rotated ninety degrees.

In examples, the first sensor 804 is oriented with an optical axis in a first direction, the second sensor 808 with an optical axis is oriented in a second direction, the third sensor 812 with an optical axis orientated in a third direction substantially opposite the first direction. In this example, the second direction is between the first direction and the third direction, and the first and second fields of view are different than the third field of view.

FIG. 8 also shows portions of a cleaning system 824. In examples, cleaning system 824 to clean a sensing surface 826 of a sensor, for example, the first sensor 804 or the fourth sensor 816. In examples, the cleaning system 824 includes a nozzle 828 configured to apply a liquid to the sensing surface 826.

In examples, the sensor pod 802 has a supply harness 830. In examples, the supply harness 830 provides power, control signals, and/or cleaning fluids to the sensor pod 800 from the vehicle. In examples, the supply harness 830 or another harness (not shown) provides data signals from the sensors to the vehicle. In examples, the supply harness includes a fluid and pressurized air connection to supply fluid and pressurized air to the cleaning system and a power connection to supply power to one or more of the sensors. In examples, the sensor pod 800 includes a sensor harness electrically coupleable to the vehicle and electrically coupled to the sensors to transmit sensor data from the sensors to a computing system of the vehicle.

In examples, the frame 802 may be made from different materials. For example, the frame 802 may be made from a metal (e.g., aluminum, steel, magnesium, or combinations thereof) or composite materials including carbon, Kevlar, resin, glass, or plastics. In examples, the frame 802 is made from cast aluminum or magnesium-aluminum alloy. In examples, the cast frame provides strength, rigidity, repeatability of manufacture, with a lower cost than a frame fully machined from a billet. In examples, the mounting locations on the frame 802 have mounting surfaces to support and orient the sensor by registering off of the mounting surface. In examples, the mounting surface is machined to provide a reference surface with tolerances sufficient to orient the sensors relative to each other as well as to the vehicle. In examples, the mounting location on the frame 802 have cast surfaces at the mounting locations to support and orient the sensor. In these examples, the cast surface does not require a secondary operation of machining to provide reference surfaces. Rather the cast surface is controlled during the casting process to provide the reference surface with tolerances sufficient to orient the sensors relative to each other as well as to the vehicle In examples, the sensor pod is asymmetric. For example, the mounting interface of the sensor pod is located at a sixth location on the frame, where the sixth location is disposed substantially opposite the second location 810. In this example, a sensor pod mount when coupled to the vehicle, protrudes from a side of the sensor pod 800.

Illustrative Pedestrian Protection System and Technique

In vehicles, for example, autonomous vehicles, safety is an important factor. As part of safety, providing protection to people within the environment that the vehicle operates is also important. In examples, vehicles may have complex systems that aid in preventing unintended contact with people within the environment. In situations where contact is not prevented, additional protection may be provided on the vehicle. In examples, this type of pedestrian protection may be designed to limit the injury to the pedestrian.

One current measure of pedestrian protection is the Head Injury Criteria ("HIC") score. This is one metric of determining the level of pedestrian protection provided by a vehicle. For example, a pedestrian protection system with a HIC score below 1000 is considered satisfactory in many jurisdictions. In examples, the HIC score is calculated by equation 1.

$$HIC = \left[ \frac{1}{t_2 - t_1} \int_{t_1}^{t_2} a\, dt \right]^{2.5} (t_2 - t_1) \quad (1)$$

Where a is a resultant head acceleration, $t_2 - t_1 \leq 15$ ms, and $t_2$, $t_1$ are selected to maximize HIC. The HIC is measure of the acceleration concentration as a proxy for force/energy applied over a period of time between $t_1$ and $t_2$. In examples, the system may use one or more of the techniques described in Regulation (EC) No 78/2009 Of The European Parliament And Of The Council of 14 Jan. 2009 on the type-approval of motor vehicles with regard to the protection of pedestrians and other vulnerable road users (discussing Head Performance Criterion ("HPC")) and European New Car Assessment Programme Pedestrian Testing Protocol, Version 8.4, November 2017 (discussing HIC15 testing) the disclosures of which are incorporated herein by reference, to test and determine an HIC or HPC score.

Figure 9:
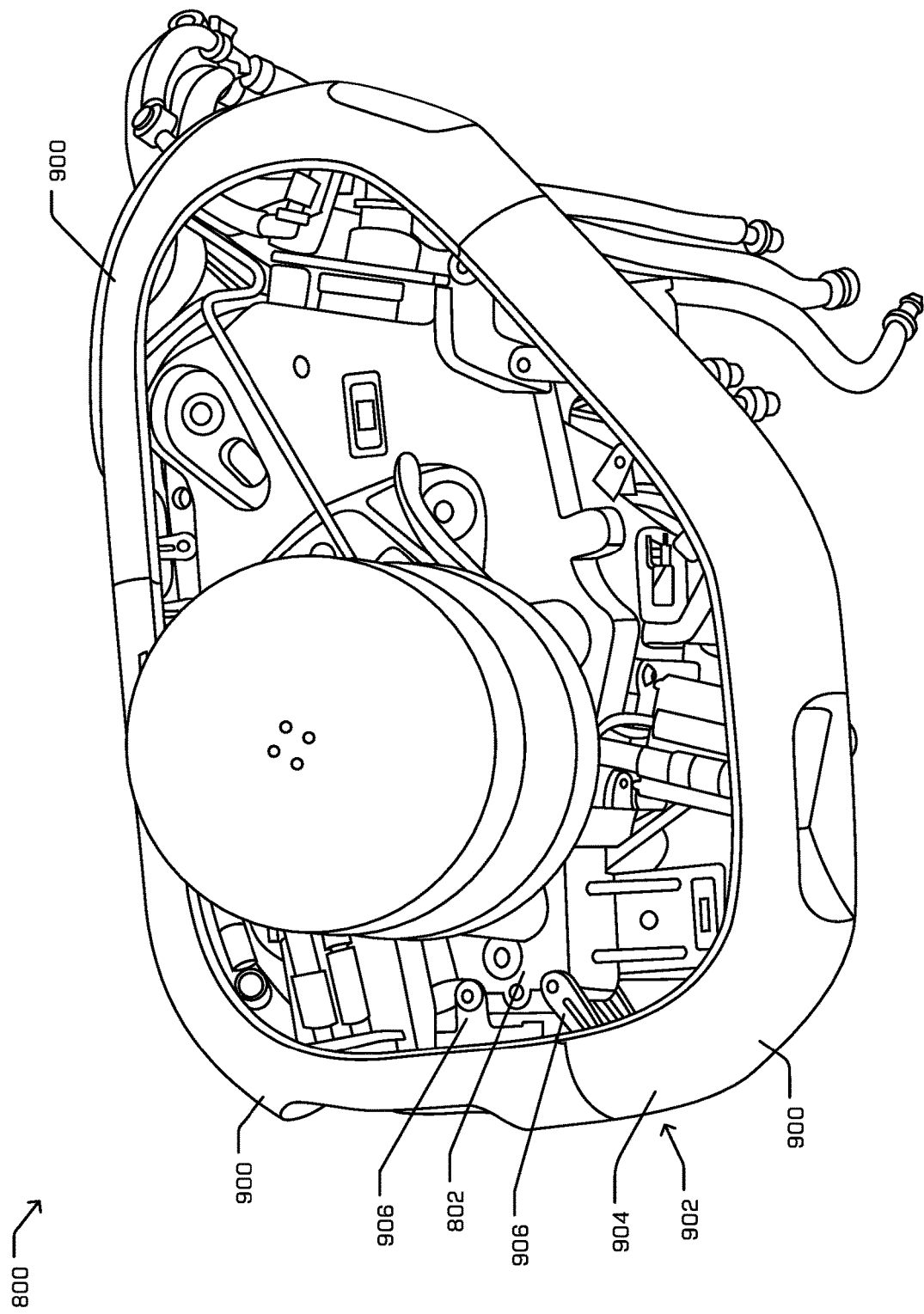
FIG. 9 is a perspective view of a sensor pod with portions of an external housing removed to show some internal components, trim components, and pedestrian protection systems, in accordance with examples of the disclosure.

FIG. 9 shows a perspective view of the sensor pod 800. In this view, the sensor pod 800 has a trim/outer shell 900 installed. In examples, the sensor pod 800 includes an impact structure 902 coupled to the frame 802. For example, the impact structure 902 may include an outer surface 904 configured to interface with a pedestrian during an impact. In examples, at least a portion of the outer surface 904 is disposed outboard of a sensor relative to the frame 802. In examples, the impact structure 902 also includes an impact energy absorbing structure 906 disposed between the outer surface 904 and the frame 802. In examples, the impact energy absorbing structure 906 is configured to absorb a portion of energy transferred through the outer surface 904 from the impact.

In examples, the impact structure 902 and/or the impact energy absorbing structure 906 may be made from various materials, including, for example, nylon, glass filled nylon, and/or glass filled polypropylene among others. For example, the impact energy absorbing structure 906 may be made from plastics (e.g., Polyethylene Terephthalate (PET or PETE or Polyester), High-Density Polyethylene (HDPE), Polyvinyl Chloride (PVC), Low-Density Polyethylene (LDPE), Polypropylene (PP), Polystyrene (PS), (ABS), others), polycarbonates, polyamide, and/or combinations thereof. In examples, the impact energy absorbing structure 906 may be made from a metal (e.g., aluminum, steel, magnesium, or combinations thereof) or composite materials including carbon, Kevlar, resin, glass, or plastics.

In examples, the sensor pod contains an inertial measurement unit ("IMU" or sensor. In examples, the vehicle receives data from the IMU indicative of an impact of the sensor pod. In examples, the system may determine, based at least in part on the data received from the IMU, that the senor pod is damaged, may be damaged, should be inspected, should be recalibrated, or should be replaced. In examples, the system may determine, based at least in part on the data received from the IMU an impact force that was applied to a pedestrian or object during the impact.

In examples, data from the sensor pod IMU is combined with data from the vehicle and/or other sensor pods. For example, data from the sensor pods IMU indicating a high deceleration may not indicate an impact to the sensor pod when, for example, data from the vehicle and/or other sensor pods indicate a similar high deceleration. In examples, large discrepancies between data from the sensor pod and data from the vehicle may indicate a misalignment and/or miscalibration of the sensor pod and/or IMU.

Figure 10:
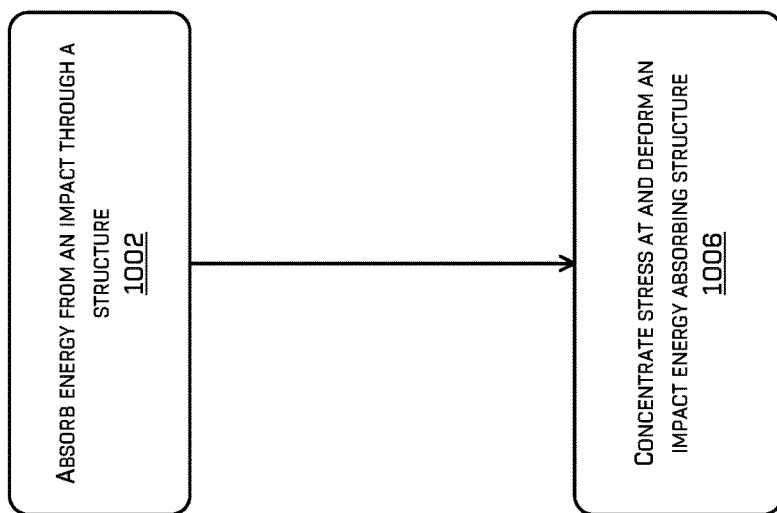
FIG. 10 is a schematic illustration of a process and technique to manage energy from an impact through energy management structures in the context of the sensor pod of FIGS. 9 and 10.
Figure 10:
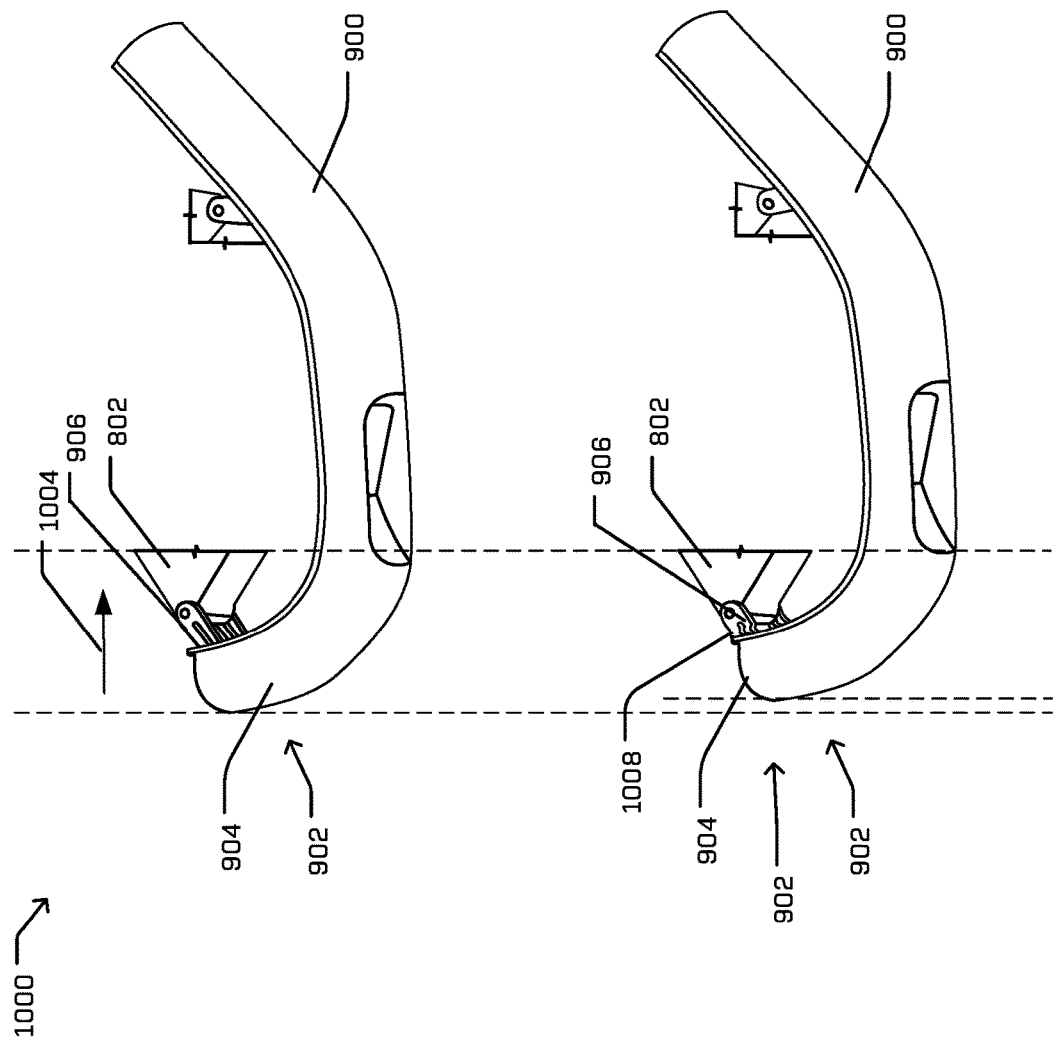

FIG. 10 is a simplified schematic illustration of a process and technique to manage energy from an impact through a pedestrian protection system. For example, FIG. 10 shows several schematic views of the impact structure 902 coupled to the frame 802. In examples, the impact structure 902 includes the outer surface 904 configured to interface with a pedestrian during an impact as well as the impact energy absorbing structure 906. FIG. 10 depicts an example process 1000 of mitigating an impact with a pedestrian or other external object. For example, at operation 1002, an impact structure, for example, impact structure 902 absorbs energy from and impact through a structure, for example, outer surface 904. In examples, the outer surface 904 may be displaced towards displaced towards an interior of the sensor pod, for example, in the direction of arrow 1004. In examples, the displacement of the outer surface 904 begins to absorb energy from the impact and direct it away from the pedestrian.

At operation 1006, the impact may cause energy to transfer to the impact energy absorbing structure 906 creating stress concentrations. In examples, the energy transferred to the impact energy absorbing structure 906 may exceed an amount causing the stress concentration to exceed a threshold causing portions of the impact energy absorbing structure 906 to deform and absorb energy from the impact. In examples, the impact energy absorbing structure 906 comprises a stress concentration zone 1008 during the impact. In examples, the stress concentration zone 1008 causes a local plastic deformation of the impact energy absorbing structure thereby absorbing energy from the impact and away from the pedestrian. For example, the absorption of this energy reduces the acceleration concentration experienced by the pedestrian. In examples, the stress concentration zone 1008 is configured to cause the local plastic deformation above a first impact force threshold and below a second impact force threshold. In this example, it is useful for the impact energy absorbing structure to be deformable enough to absorb enough energy from the impact to protect a pedestrian, but not so deformable, that unnecessary damage is caused during handling or minor impacts. Additionally, it is useful for the impact energy absorbing structure to not be too stiff such that it does not absorb enough energy from the impact to protect a pedestrian.

In examples, the stress concentration zone 1008 is tailored using material properties and/or geometrical features. For example, a cross-sectional thickness of impact energy absorbing structure 906 may be varied across the structure to locate and/or limit the stress concentration zone 1008 at a certain location with a certain region to absorb a desired amount of energy. In examples, the geometrical features include added material, for example, a ridge, rib, swell, or gusset, removed material, for example, a slot, hole, or recess, and/or contours, for example, a fillet, curve, or radius. In examples, combinations are used to create complex shapes, for example, an I-beam, a C-channel, a tube, and/or a T-beam among others.

In examples, the second impact force threshold is associated with an HIC score of 1000. In examples, the second impact force threshold is associated with an HIC score of 650. In examples, the first impact force threshold is associated with an HIC score of 100. In examples, the first impact force threshold is associated with an HIC score of 300.

In examples, the outer surface 904 is configured to move substantially uniformly with respect to itself during the impact. In this example, the impact energy absorbing structure 906 absorbs most of the energy transferred during the impact.

In examples, the outer surface being configured to deflect or bend with respect to itself up to a maximum deformation. In examples, the maximum deformation is approximately 50% of a form thickness of the outer surface.

In examples, the outer surface is substantially convex or curved. In examples, this shape may provide a structural stiffness to weight ratio benefit. In examples, the outer surface is substantially convex in two orthogonal directions. In this example, the outer surface may be curved in two directions creating a shell effect which may provide a structural stiffness to weight ratio benefit.

In examples, the impact energy absorbing structure 906 couples the outer surface 904 to the frame 802. In examples, the impact energy absorbing structure 906 provides support to the outer surface 904 in a direction substantially perpendicular to the direction of the impact. For example, the impact energy absorbing structure 906 may help to support the outer surface in a vertical direction as well as side to side.

In examples, the impact energy absorbing structure 906 has one or more of a thickness, a cross section, or a planform configured to provide an impact load absorption profile. In examples, these features are tailored to control the stress concentrations and deformation of the impact energy absorbing structure 906. In examples, the impact energy absorbing structure may be constructed of a substantially homogenous material or a composite material.

In examples, the impact structure 902 may provide protection through application to another sensor disposed above the frame, for example, frame 802 and coupled to the frame 802 by a deformable fastener. For example, the sensor disposed above the frame 802 may be a lidar sensor. In examples, the sensor is coupled to the frame through a deformable fastener comprising a stress concentration zone. In examples, the stress concentration zone of the deformable faster causes local plastic deformation of the deformable fastener that absorbs energy from the impact. In examples, the deformable fastener releases the sensor when the impact exceeds an impact force threshold. For example, when an impact is great enough, the deformable fastener may sheer allowing the sensor to detach from the frame. In examples, the sensor, when released from the frame may clear the pedestrian or obstacle when mounted near the top of the vehicle. In examples, the deformable fasteners absorb enough energy to slow the sensors relative speed enough to mitigate a secondary impact if the sensor does not clear the obstacle. In examples, the deformation of the deformable fasteners absorb energy reducing the overall energy that is absorbed by the impact energy absorbing structure 906 away from the sensor.

The impact structure 902 may also include a baffle structure. For example, FIGS. 8 and 9 also show a baffle structure 832 disposed between the sensor 804 or sensor 808 and the outer shell 900. In examples, the baffle structure 832 includes a crumple zone configured to plastically deform during an impact and absorb energy from the impact. In examples, this feature works similarly to and in conjunction with the outer shell 900, the outer surface 904, and the impact energy absorbing structure 906.

Illustrative Calibration Systems and Techniques

Techniques described herein are directed to calibrating sensors of a sensor pod and vehicle without necessitating infrastructure, e.g., without fiducial markers. In general, such calibration may refer to either "extrinsic" calibration (that is determining one or more of a location or orientation of the sensor relative to some origin, e.g. another sensor, an origin of the system, etc.) or "intrinsic" calibration (that is determining one or more parameters about the sensor itself, e.g., a focal length, a center point, a lens distortion model, and the like). An example of a system is an autonomous vehicle having multiple sensor pods having multiple sensors (of various modalities), though any other system is contemplated (e.g. smartphones having an image sensor, robotic manipulators having one or more sensor modalities, and the like). In one such example (i.e. where the system is an autonomous vehicle), the autonomous vehicle can include a sensor of a sensor pod configured to generate sensor data of an environment of the vehicle or the sensor pod.

The vehicle or sensor pod may also generate or otherwise access semantic segmentation information that identifies objects in the environment. For instance, semantic segmentation information may classify sensor data, e.g., on a pixel-by-pixel or point-by-point basis to associate each pixel or point with an object or object type. When the sensor is correctly calibrated (e.g., internally), the sensor data and the semantic segmentation information can be combined to produce an aligned representation of the environment. However, when the sensors are improperly calibrated, e.g., there is a calibration error, the sensor data and the semantic segmentation information, when combined, can form an inaccurate, or "blurry," representation of the environment. In a real-world example, as applied to autonomous vehicles and as an illustration of the need for a highly accurate calibration, a misalignment of sensors on the order of 0.5-degrees may result in an inability to determine with certainty a lane in which an object 100 meters away is travelling. Thus, while sensors are calibrated upon installation to meet these exacting standards, it may be important to verify that sensors remain properly calibrated. For instance, sensors may be subject to environmental contaminants, degradation due to normal driving and use, as well other factors that can cause sensors to develop calibration errors.

When installing sensor pods, it may be beneficial to take calibration factors of the sensor pod into account. For example, biases and/or calibration limitations may be present in a given sensor pod and may limit the compatibility of two sensor pods in some instances. For example, a first sensor pod may have a first bias that such that, when paired on a vehicle with a second sensor pod with a second bias, the combination of the sensor pods may not provide the desired sensor coverage in certain cases. However, when the first sensor pod is paired with a third sensor pod with a third bias, the two sensor pods provide the desired sensor coverage. The certain cases may be extreme cases, where multiple sensors or sensor pods fail on a vehicle, and the remaining sensors are used to safely control the vehicle. In examples, determining the compatibility of sensor pods prior to installation on the vehicle, may reduce rework and downtime of a vehicle, since, for example, one or more of the sensor pods would not need to be removed and replaced prior to the vehicle entering service.

In examples described herein, calibration techniques can be used to validate calibration of and/or calibrate one or more sensors mounted in a sensor pod and/or vehicle. In some implementations, sensors of one or more modalities may be mounted to capture sensor data, e.g., images, radar returns, LiDAR returns, time-of-flight data, or the like, covering a field of view of the sensor pod. In examples, multiple sensor pods may be mounted to an autonomous vehicle and provide an effective field of view covering 360-degrees around the autonomous vehicle, and each sensor can provide sensor data necessary to ensure safe navigation of the vehicle, i.e., relative to objects in the environment of the vehicle. In examples, the calibration technique can include leveraging fiducials or invariant objects in calibrating the sensors on a sensor pod. When using invariant objects, the calibration techniques can include leveraging semantic segmentation information to determine calibration errors. More specifically, techniques can include determining objects in semantic segmentation information and comparing features in sensor data generated by a sensor to the object. For example, objects in the semantic segmentation information can include invariant objects, which may include fixed and/or known objects that may not change or move over time and/or for which one or more attributes, such as geometric attributes, reflective features, or the like are readily known. For instance, invariant objects can include linear objects, such as walls, posts, ceilings, corners, roof lines of structures or vehicles, buildings, horizons, and the like. Invariant objects may also include planar surfaces, such as signs, a surface, a wall, the side of a building, machinery, a side of a trailer or large automobile, and the like. In other examples, street signs may be known to be retroreflective. In still further examples the invariant objects may have other attributes that are known or knowable. In at least other examples, such invariance may correspond to features and/or attributes of the object and not the object itself. As a non-limiting example of such, a tractor trailer may move, yet have planar surfaces and straight-lines of intersection of such surfaces. Similarly, traffic light poles may change state (red, yellow, green, etc.), while having a same relative position, orientation, geometric features, or the like.

In some implementations, features can be extracted from the sensor data to compare to the object(s) in the semantic segmentation information. By way of non-limiting example, edges can be detected in the sensor data, e.g., using an edge detection algorithm in an image or depth discontinuities in three-dimensional sensor data. Such edges may be investigated to determine whether they are linear, as expected from the a priori knowledge about the invariant object. In other implementations, points, e.g., having a depth measurement, can be identified as being associated with a planar surface in an invariant object. Those points can then be investigated to confirm coplanarity. In some examples, the features may be determined from undistorted data, e.g., undistorted using parameters, e.g., intrinsics, of the sensor. In at least some examples, errors may determined with respect to the distorted space (e.g., how far point fall from an expected distorted line or plane) or the undistorted space (e.g., a measure of collinearity or coplanarity).

As noted above, sensed features should closely align with objects from the semantic segmentation information in a well-calibrated sensor. On the other hand, misalignment may be indicative of a calibration error in the sensor. Thus, according to implementations described herein, techniques can quantify how much features in the sensor data deviate from their expected value, e.g., how much they deviate from co-linearity or coplanarity expected from the attributes of the invariant object. Also in some instances, a misalignment can be quantified, e.g., as a distance between points or pixels in the sensor data and the expectation embodied by the invariant object determined from the semantic segmentation information.

In some examples, the calibration error can be compared to a threshold error, e.g., to determine whether the error is acceptable, of if some corrective action must be taken. Corrective actions can include taking the sensor offline, taking the sensor pod offline, taking the vehicle offline, recalibrating the sensor, controlling the vehicle at the exclusion of sensor data from the sensor, or the like. In some instances, the calibration data can be used to determine updated calibration information, and subsequently-acquired sensor data can be calibrated using the updated calibration information.

Calibration techniques discussed herein can improve the functioning of a computing device by providing a framework to determine optimal calibration for sensors, e.g., an array of cameras, on a sensor pod of an autonomous vehicle. By calibrating one or more cameras using the calibration techniques described herein, the cameras can generate data representing an environment with a high degree of accuracy and precision about the environment while providing the desired field of view coverage of the vehicle. For example, sensor pods that have been calibrated in this manner can provide more consistent sensor coverage during operation, which can ultimately lead to better safety outcomes while driving and reduce reworking of the vehicle to achieve. These and other improvements to the functioning of a computing device are discussed.

The calibration techniques discussed herein also represent improvements over conventional calibration and/or calibration validation. For example, in the past, calibration techniques often required the sensors to be installed and active on a vehicle. For example, some techniques require that the sensors be installed on a vehicle, activated, and tested. Such conventional techniques suffer from intensive time and integration efforts with the vehicle offline to implement. In contrast, techniques described herein may allow for calibration of the sensors at the sensor pod level and may be conducted separately from the vehicle, for example, while the vehicle is still in service. Additionally or alternatively, techniques described herein may allow for calibration of vehicle with the new sensor pod(s) installed to be calibrated more quickly and efficiently. For instance, the techniques may allow a vehicle to calibrate the sensors of the new sensor pod using a reduced set of variables. Additionally, the techniques may allow a vehicle to calibrate the sensors of the new sensor pod knowing that a calibration solution exists, since, for example, the sensor pods installed where determined to be compatible with each other. Thus, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use and/or validation of such calibration. The techniques described herein are not limited to autonomous vehicles. In another example, the methods, apparatuses, and systems may be utilized in an aviation or nautical context. Additionally, the techniques described herein may be used with real data (e.g., captured using one or more sensors), simulated data (e.g., generated by a simulator) or any combination thereof.

Figure 11:
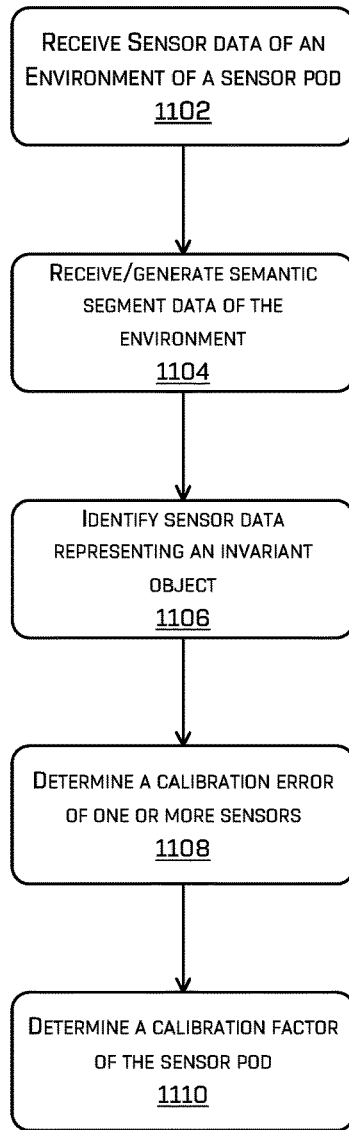
FIGS. 11-13 are illustrations of processes and technique to calibrate sensor pods, in accordance with examples of the disclosure.
Figure 12:
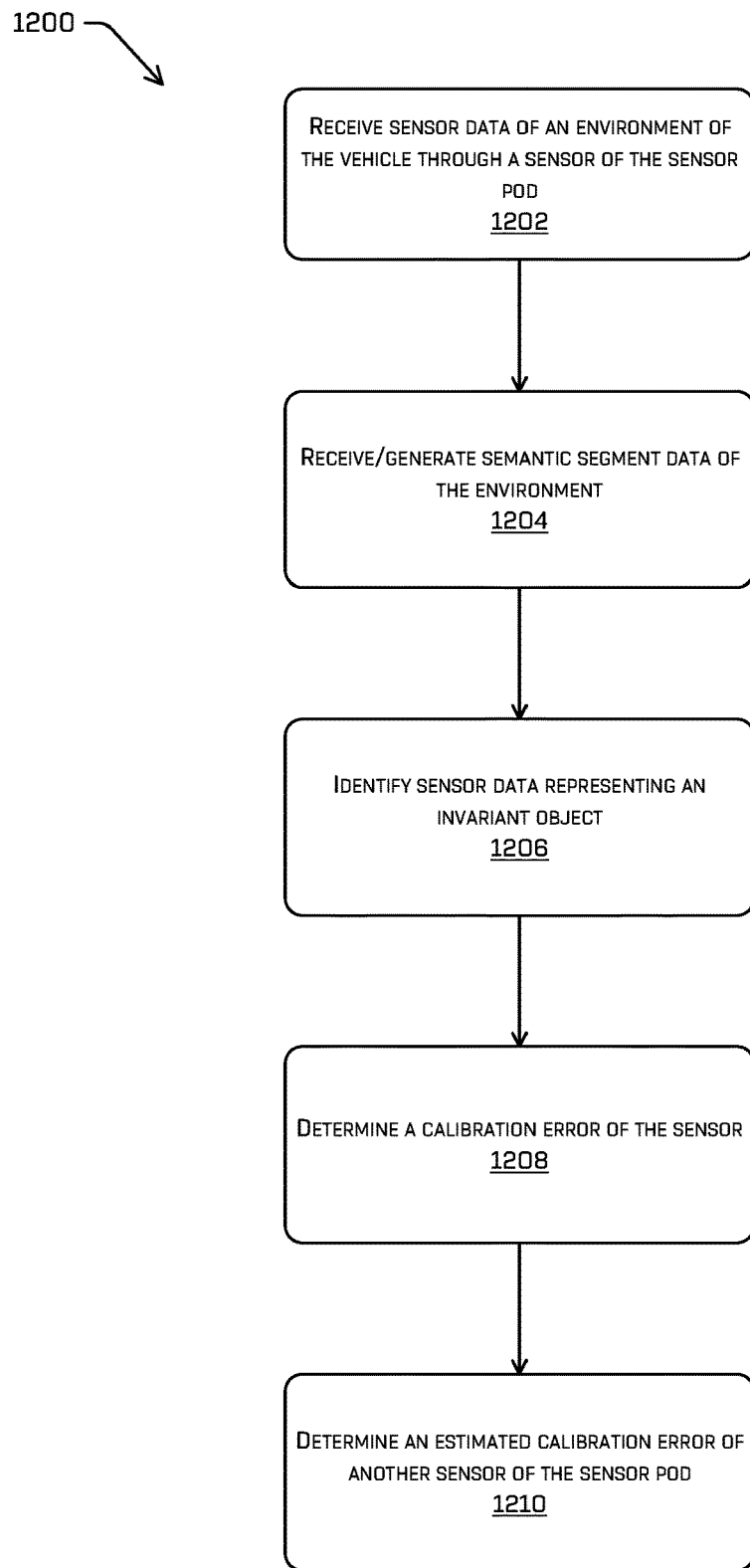
Figure 13:
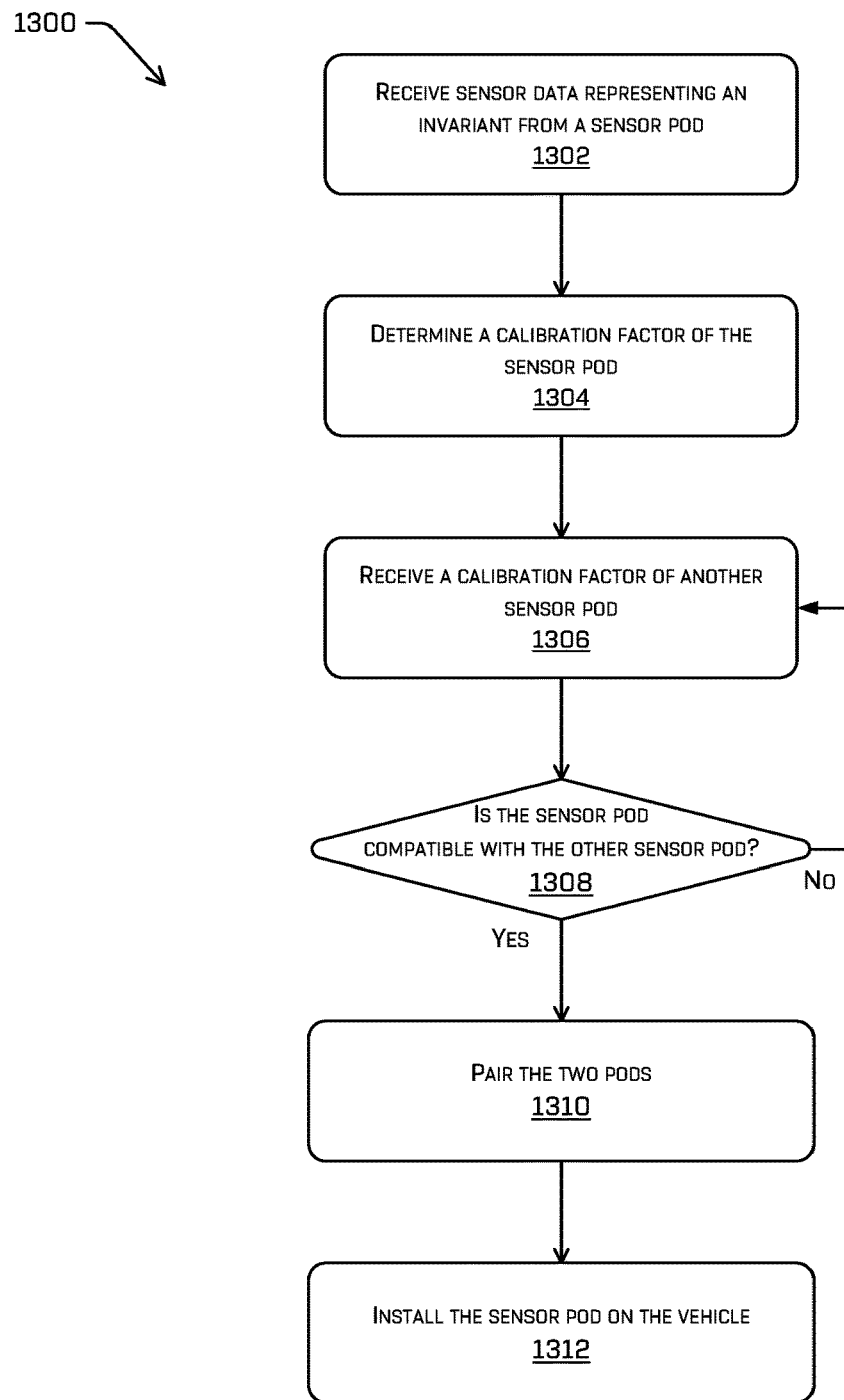

FIGS. 11-13 are flowcharts showing example methods and process involving calibration of sensors and sensor pods and installation on autonomous vehicles. The methods illustrated in FIGS. 11-13 are described with reference to one or more of the vehicles, sensor pods, and/or systems shown in FIGS. 1-10 for convenience and ease of understanding. However, the methods and processes illustrated in FIGS. 11-13 are not limited to being performed using the vehicles, sensor pods, sensors, and/or systems shown in FIGS. 1-11, and may be implemented using any of the other vehicles, sensor pods, and/or systems described in this application, as well vehicles, sensor pods, and/or systems other than those described herein. Moreover, the vehicles, sensor pods, and/ or systems described herein are not limited to performing the methods and processes illustrated in FIGS. 11-13.

In some examples, the system may use one or more of the techniques described in U.S. Non-provisional patent application Ser. No. 15/820,245, filed on Nov. 21, 2017, and/or U.S. Non-provisional patent application Ser. No. 16/297,127, filed Mar. 8, 2019, the disclosures of which are incorporated herein by reference, to calibrate individual sensors or sensors on the vehicle.

FIG. 11 depicts an example process 1100 of calibrating a sensor pod of a vehicle. At operation 1102, the calibration system may receive sensor data of an environment of the sensor pod. In examples, the sensor pod may be mounted to a stand and a computing system to collect and/or process the sensor data. In examples, the stand may be rigid or may be free to move. In examples, the sensor pod may be held by hand during the data collection. In examples, a sensor of the sensor pod may be a camera or other sensor configured to capture data, for example, an image. In examples, the image may be distorted due to intrinsic features of the sensor, for example, a fish-eye or wide-angle lens. The sensor can be other types of cameras, e.g., linear cameras, or the like or the sensor can be a different modality of sensor altogether. By way of non-limiting example, the sensor may be a lidar sensor or time-of-flight sensor that generates depth information associated with light returns, or the like.

In examples, the environment contains one or more invariants within a 90-degree field of view. In examples, the test mount may have indexed orientations, where data can be collected from multiple sensors at multiple indexed orientations of one or the one or more invariants. In this example, fewer invariants may be needed to calibrate the sensors of a sensor pod.

In examples, the sensor data includes image data about a plurality of objects in the environment. For example, fiducial, a wall, a corner of a building, a vehicle, a piece of machinery, a pole, and other features. As will be appreciated, the image data may include sensed data about invariant, variant, static, dynamic, and/or any features in the field of view of the sensor.

At operation 1104, the process can include receiving and/or generating semantic segmentation information about the environment (e.g., based at least in part on the sensor data obtained in 1102). In examples, a semantic segmentation representation may indicate classification information about a portion of the environment. More specifically, the representation may include graphical object representations of different objects or features in the environment, e.g., based on classifications of those objects. For example, the object representations may include a wall, a corner, a ceiling, a pole, a piece of machinery, among others. In examples, each of the respective object representations may visually identify pixels having the same label or classification. Accordingly, a wall representation includes pixels having a "wall" label or classification, a ceiling representation include pixels having a "ceiling" label or classification, and so forth. Thus, for example, the semantic segmentation information can include per-pixel classification information. As noted above, although FIG. 11 is described in terms of the sensor being a camera generating the image, other sensor modalities also are contemplated (for instance, three-dimensional sensors). Similarly, the semantic segmentation information can be generated from data from one or more sensor modalities, which may or may not include an image sensor.

In examples, the semantic segmentation information can include information about invariant objects. As used herein, "invariant objects" may be objects that have known characteristics or attributes, such as linear edges, planar surfaces, a known orientation, or the like. In some examples, invariant objects may be objects that are fixed in the environment, e.g., that are generally expected to remain the same or unmoved. For example, invariant objects can be topographical features, e.g., road surfaces, sidewalk surfaces, some trees, or the like, fixtures, e.g., buildings, street signs, lampposts, fire hydrants, guardrails, or the like, or other generally stationary objects or features having a known structure and/or orientation. In some examples of this disclosure, the horizon can be an invariant object, for instance. In still further examples, invariant objects can include nonstationary objects having some known characteristic or attribute. For example, a trailer of a tractor-trailer may be an invariant object because it may have known linear edges and/or planar sides. Implementations of this disclosure may use semantic segmentation information about invariant objects. In other implementations, the semantic segmentation information can include additional semantic segmentation information, e.g., of non-invariant objects, including but not limited to information about vehicles, pedestrians, bicyclists, or the like. Techniques described herein, however, may only consider data associated with invariant objects or fiducials.

At operation 1106, the process 1100 includes identifying sensor data corresponding to one or more invariant objects in the semantic segmentation information. In examples, image data corresponding to one of the invariant objects may represent a feature known to be associated with an invariant object. For instance, image data associated with a wall may have a vertical edge, e.g., at corners of the wall, and/or a horizontal edge, e.g., at the bottom of the wall, the ceiling, or the like. Similarly, image data associated with a pole may have two vertical edges, e.g., at the lateral extents of the pole, because a pole is known to be relatively straight and/or have a vertical orientation. However, and as discussed above, many factors may influence the actual calibration of the sensor. For example, manufacturing and/or assembly tolerances associated with the sensor, the sensor pod, the vehicle, sensor pod mounts on the vehicle, and/or the like, may result in improper calibration of the sensor relative to an expectation. Additionally, the sensor may become uncalibrated through regular driving, e.g., due to vibrations associated with the vehicle, environmental variations, such as temperature, and/or other factors. Techniques described herein are useful in identifying misalignment caused by these and other sources. Additionally, or alternatively, comparisons of semantic segmentations of differing sensor modalities may be compared (whether containing invariant objects or not). In such examples, a known calibration may be used to transform data in one modality to a reference frame associated with the other. Differences between the associated modalities (and/or aggregate statistics associated therewith) may be used to infer a calibration error (whether intrinsic or extrinsic). In at least some examples, semantic information associated with sparse data (e.g., lidar) may be projected using the previous calibration information into a denser sensor modality (e.g., images) for comparison.

In examples, a comparison of the sensor data, e.g., image data, to an expectation of the image data, e.g., corresponding to an invariant feature, gleaned from the semantic segmentation information may reveal a calibration error. In examples, the system may identify points associated with the invariant object based on the semantic segmentation information. For example, a pole may be an invariant object, e.g., because it includes a (vertical) linear edge or shape.

At operation 1108, the process can include determining a calibration error for the sensor. For example, techniques described herein may determine the error based on a distance between the sensor data and an expected value (based on the known attributes of the invariant objects) associated with those points. In at least one example, such an error may comprise the distance between individual of the points based on the semantic segmentation information and an expected shape of the invariant object. The distances may represent the calibration error. In some examples, the distances can be Euclidian distances, measured in pixels, between the respective points and the expected shape. In some examples, the distance may be dependent on other features of the sensor (for examples, fish eye cameras may have high radial distortion and Euclidian distances determined for errors may be inversely scaled with respect to a radius). In other examples, an arc may be fit to the points, with the arc being compared to the expected shape to determine the calibration error. In some implementations, if the error determined at the operation 1108 is within, e.g., equal to or less than, some threshold error, the sensor may be determined to be properly calibrated. However, if one or more errors are outside of, e.g., equal to or greater than, some threshold error, the sensor may be determined to have incorrect calibration.

In some implementations, the semantic segmentation information can include labels for all pixels in a scene, and thus the pixels can be determined as the outermost pixels having the "pole" label or classification. In some implementations a line may be fit to the pixels, with the line representing the signpost in the semantic segmentation information.

In examples, the process includes determining a calibration error for multiple sensors of a sensor pod. In examples, the multiple sensors are calibrated individually or in parallel. In examples, the invariant object may be the same or a different object. In examples, the invariant object maybe located where the fields of view of two or more of the sensors overlap.

At operation 1110, the process can include determining a calibration factor for the sensor pod. As discussed with respect to operation 1108, the calibration error of multiple sensors may be determined. In examples, the individual sensor errors may be combined to determine a calibration factor for the sensor pod. In examples, the calibration factor may include multiple values. For example, the calibration factor may include a value for each sensor representative of the calibration error of the respective sensor. In examples, the calibration factor of the sensor pod may be used in various processes. For example, the calibration factor may be used to calibrate the sensor pod when it is installed on a vehicle. Additionally, or alternatively, the calibration factor may be used to match the sensor pod with another compatible sensor pod prior to installation on a vehicle. In some examples, such a calibration factor may be used in further processing such that algorithms which rely on the calibration may downweight one or more components of the associated miscalibrated sensor. In various examples, determining the miscalibrated sensor may comprise comparing a single sensor to multiple other sensors (e.g., two or more additional sensors in order) to determine a confidence that it is miscalibrated.

FIG. 12 depicts an example process 1200 of calibrating a sensor pod of a vehicle when the sensor pod is installed on the vehicle. At operation 1202, the system may receive sensor data of an environment of a sensor on the sensor pod. In examples, the sensor may receive sensor data similar to the process discussed with respect to FIG. 11. In examples, the sensor data includes image data about a plurality of objects in the environment. For example, fiducial, a wall, a corner of a building, a vehicle, a piece of machinery, a pole, and other features. As will be appreciated, the image data may include sensed data about invariant, variant, static, dynamic, and/or any features in the field of view of the sensor.

At operation 1204, the process can include receiving and/or generating semantic segmentation information about the environment (e.g., based at least in part on the sensor data obtained in 1202). In examples, a semantic segmentation representation may indicate classification information about a portion of the environment. In examples, the sensor may receive or generate semantic segmentation information similar to the process discussed with respect to FIG. 11.

At operation 1206, the process 1200 includes identifying sensor data corresponding to one or more invariant objects in the semantic segmentation information. In examples, image data corresponding to one of the invariant objects may represent a feature known to be associated with an invariant object. For instance, image data associated with a wall may have a vertical edge, e.g., at corners of the wall, and/or a horizontal edge, e.g., at the bottom of the wall, the ceiling, or the like. In examples, the sensor may identify invariant objects similar to the process discussed with respect to FIG. 11.

At operation 1208, the process can include determining a calibration error for the sensor. For example, techniques described herein may determine the error based on a distance between the sensor data and an expected value (based on the known attributes of the invariant objects) associated with those points. In examples, the sensor may identify invariant objects similar to the process discussed with respect to FIG. 11.

At operation 1210, the process can include determining a calibration error for another sensor of the sensor pod. In examples, the calibration factor for a sensor pod is based on calibration errors for each sensor of the sensor pod relative to the sensor pod, for example, the interface of the sensor pod to the test stand or vehicle mount. In examples, the calibration error determined at operation 1208 is based the calibration error of the sensor of the sensor pod relative to the vehicle. In this implementation, the calibration error of the sensor is be combined with the sensor pod calibration factor to determine an estimated calibration error for other sensors of the sensor pod relative to the vehicle. In examples, the estimated calibration error can be verified by the vehicle. In examples, the estimated calibration error provides an accurate starting point for the vehicle's system to confirm or refine the calibration of the other sensors. In examples, this ensures a closed solution when solving for the calibration error in certain techniques. As discussed above, the calibration factor may also be used to match the sensor pod with another compatible sensor pod prior to installation on a vehicle.

FIG. 13 depicts an example process 1300 of determining, prior to installation, whether a sensor pod is compatible with another sensor pod, for example, on a vehicle. In examples, the compatibility of a sensor pod with another sensor pod is whether the effective fields of view of the respective sensor pods are compatible with each other. In examples, the effective fields of view of compatible sensor pods provides a field of view overlap above a field of view overlap threshold. At operation 1302, the system may receive sensor data of an environment of a sensor on the sensor pod and identifies an invariant object. In examples, the sensor may receive sensor data, generate semantic segmentation data, and identify an invariant object similar to the processes discussed with respect to FIGS. 11 and 12. In examples, the sensor data includes image data about a plurality of objects in the environment. For example, fiducial, a wall, a corner of a building, a vehicle, a piece of machinery, a pole, and other features. As will be appreciated, the image data may include sensed data about invariant, variant, static, dynamic, and/or any features in the field of view of the sensor. In examples, the process may identify image data corresponding to one of the invariant objects may represent a feature known to be associated with an invariant object. For instance, image data associated with a wall may have a vertical edge, e.g., at corners of the wall, and/or a horizontal edge, e.g., at the bottom of the wall, the ceiling, or the like.

At operation 1304, the process can include determining a calibration factor for the sensor pod. In examples, the calibration error of multiple sensors may be determined. In examples, the individual sensor errors may be combined to determine a calibration factor for the sensor pod. In examples, the calibration factor may include multiple values. For example, the calibration factor may include a value for each sensor representative of the calibration error of the respective sensor. In examples, the calibration factor of the sensor pod may be used in various processes. For example, the calibration factor may be used to calibrate the sensor pod when it is installed on a vehicle. Additionally, or alternatively, the calibration factor may be used to match the sensor pod with another compatible sensor pod prior to installation on a vehicle, for example, by determining whether the respective fields of view of the sensor pods provide the desired fields of view overlap. In examples, the sensor may determine a calibration factor similar to the process discussed with respect to FIG. 11.

At operation 1306, the system may receive a calibration factor of another sensor pod. For example, a second sensor pod may be considered for pairing with the first sensor pod where the first sensor pod's calibration factor is determined in operation 1304 and the calibration factor for the second pod is received at this operation. In examples, the second sensor pod may be a sensor pod already installed on a vehicle. In examples, the second sensor pod may be a sensor pod not yet installed on a vehicle.

At operation 1308, the process determines whether the first sensor pod is compatible with the second sensor pod, for example, by determining whether the field of view of the first sensor pod provides the desired fields of view overlap when combined with the field of view of the second sensor pod. In examples, the determination is based at least in part on the calibration factor of the first sensor pod and the calibration factor of the second sensor pod. In examples, the first and second sensor pods may be compatible with each other in normal use regardless of the calibration factor. However, in some examples, the sensor pods may not provide the desired sensor redundancy or field of view overlap in certain circumstances. For example, if a sensor or a sensor pod malfunctions or is offline, the remaining sensors or sensor pods may require a threshold level of sensor coverage. In this example, the process uses the calibration factors of the respective sensor pods to determine whether the first and second sensor pods will provide such coverage if a number of sensors are lost. While these examples, discuss two sensor pods for clarity, the process may take into account three, four, or more sensor pods when determining compatibility. For example, the process may determine whether the first sensor pod is compatible with three other sensor pods. For example, the process may determine whether the effective fields of view of the first sensor pod and the three other sensor pods provide the desired fields of view overlap. In one non-limiting example, the process may determine whether a replacement sensor pod is compatible with the three sensor pods already installed on a vehicle. For example, the process may determine whether the effective fields of view of the first sensor pod and the three other sensor pods already installed provide the desired fields of view overlap.

If, at operation 1308, the process determines that the sensor pods are not compatible, the process returns to operation 1306 and receives a calibration factor of another sensor pod to evaluate. For example, the process determines that the fields of view of the sensor pods do not provide the desired fields of view overlap.

If, at operation 1308, the process determines that the sensor pods are compatible, for example, compatible fields of view, then, at operation 1310, the two sensor pods are paired. In examples, when sensor pods are paired, an indication may be included in a database or provided to an operator, that the sensor pods are compatible, for example, have compatible fields of view. In examples, where the two sensor pods are not installed on a vehicle, the sensor pods may be stored and later installed on a vehicle together. In examples, when one of the sensor pods is already installed on a vehicle, the other sensor pod may be set aside until a replacement sensor pod is needed.

At operation 1312, the sensor pod is installed on a vehicle with the other sensor pod. In examples, the sensor pod may be a replacement sensor pod. In examples, the sensor pod may be grouped with additional compatible sensor pods and installed on the vehicle at the same time.

Figure 14:
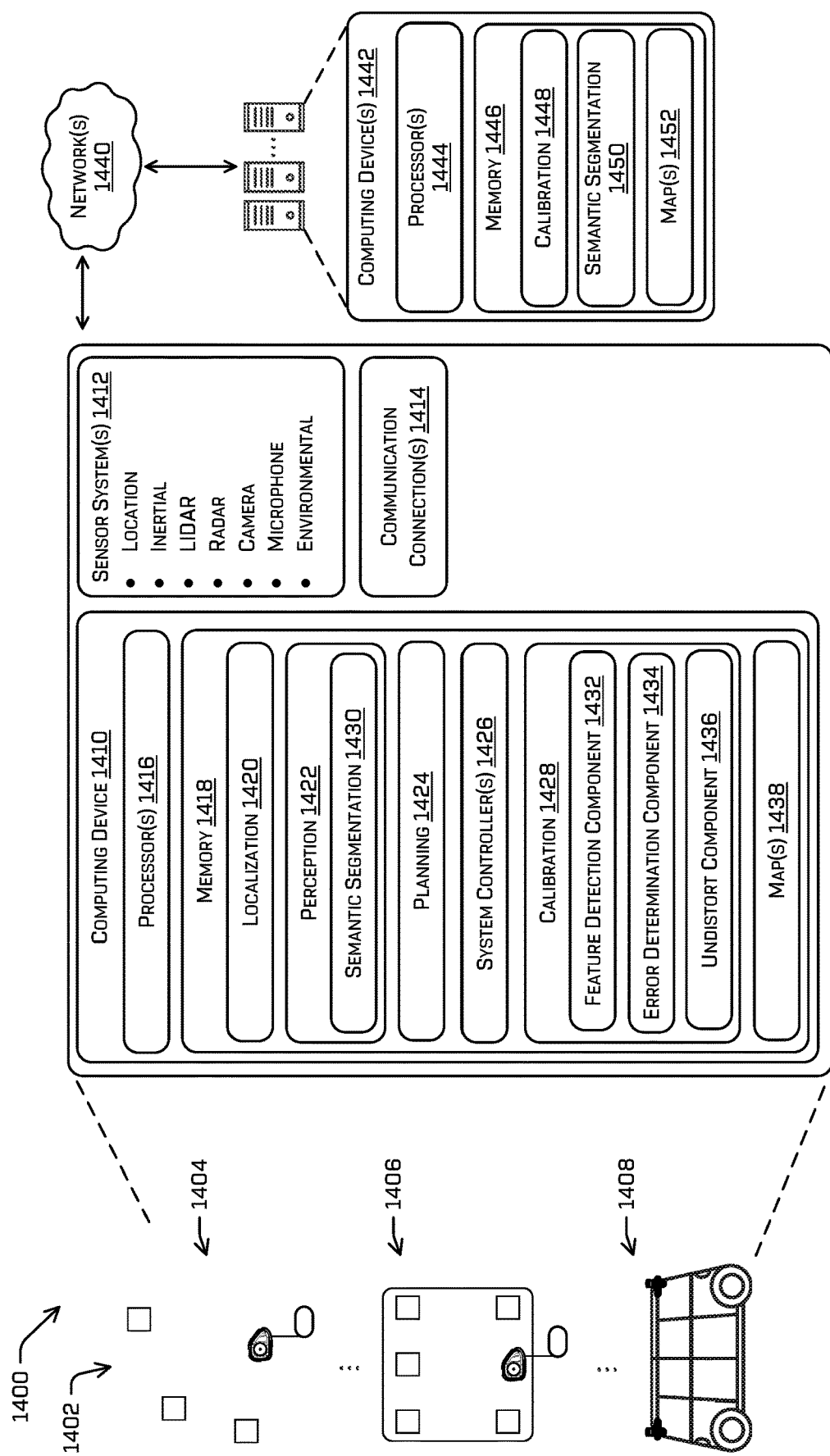
FIG. 14 is a block diagram of an example system for implementing the techniques of FIGS. 11-13.

FIG. 14 illustrates a block diagram of an example system 1400 for implementing the techniques described herein. In at least one example, the system 1400 can include a sensor pod platform 1402 and control system or a vehicle, which can be the same vehicle as the vehicle 100 described above with reference to FIGS. 1-4.

The sensor pod platform 1402 can include a constrained test mount 1404, an unconstrained test mount 1406, or a vehicle 1408 and may include a computing device 1410, one or more sensor systems 1412, for example, one or more sensor pods, and one or more communication connections 1414.

The computing device 1410 can include one or more processors 1416 and memory 1418 communicatively coupled with the one or more processors 1416. In the illustrated example, the sensor pod platform 1402 may be a test mount or an autonomous vehicle; however, the autonomous vehicle can be any other type of vehicle autonomous or not. Moreover, and as described herein, the techniques described herein are not limited to vehicles and test mounts, but to any device that has a sensor and access to semantic segmentation information about an environment of the sensor (or otherwise able to generate such information). In the illustrated example, the memory 1418 of the computing device 1410 stores a localization component 1420, a perception component 1422, a planning component 1424, one or more system controllers 1426, and a calibration component 1428. As also illustrated, the perception component 1422 can include a semantic segmentation component 1430, and the calibration component 1428 can include a feature detection component 1432, an error determination component 1434, and an undistort component 1436. The memory 1418 can also store one or more map(s) 1438. Though depicted in FIG. 14 as residing in memory 1418 for illustrative purposes, it is contemplated that several of the features, including the calibration component 1428, the semantic segmentation component 1430, the map(s) 1438 and/or other components may additionally, or alternatively, be accessible to the sensor pod platform 1402 (e.g., stored remotely).

In at least one example, the localization component 1420 can include functionality to receive data from the sensor system(s) 1412 to determine a position of the sensor pod platform 1402. For example, the localization component 1420 can include, request, and/or receive a three-dimensional map of an environment, e.g., from the map(s) 1438, and can continuously determine a location of the sensor pod platform 1402 within the map. In some instances, the localization component 1420 can utilize SLAM (simultaneous localization and mapping) or CLAMS (calibration, localization and mapping, simultaneously) to receive image data, LIDAR data, radar data, SONAR data, IMU data, GPS data, wheel encoder data, and/or the like to accurately determine a location of the sensor pod platform 1402. As discussed herein, the localization component 1420 may receive calibrated sensor data, e.g., sensor data that is within a threshold acceptability, as discussed herein.

In some instances, the perception component 1422 can include functionality to perform object detection, segmentation (e.g., semantic segmentation via functionality provided by the semantic segmentation component 1430), and/or classification. In some examples, the perception component 1422 can provide processed sensor data that indicates a presence of an entity that is proximate to the sensor pod platform 1402 and/or a classification of the entity as an entity type (e.g., car, pedestrian, cyclist, animal, tree, road surface, curb, sidewalk, lamppost, signpost, unknown, etc.). In additional and/or alternative examples, the perception component 1422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

As noted above, the perception component 1422 can also include the semantic segmentation component 1430. In some implementations, the semantic segmentation component 1430 may cause the computing device 1410 to perform semantic segmentation on image data, LiDAR data, and/or other sensor data generated by the sensor system(s) 1412 to determine classifications or labels associated with pixels, points, or other portions of sensor data. In some embodiments, the semantic segmentation component 1430 may include one or more machine learning algorithms trained to identify and segment image data into semantic categories. For example, the semantic segmentation component 1430 may include a convolutional neural network (CNN) configured to perform semantic segmentation on images or other sensor data and/or to determine pixel classification probability distributions for pixels of images, though any other form of semantic segmentation on the image is contemplated. In at least some examples, the semantic segmentation component 1430 may determine classifications or labels for data components including, but not limited to, car, truck, bicycle, motorcycle, pedestrian, particulate matter, building, road sign, lamppost, signpost, tree, bush, or the like, in addition to, navigable surface, free space, drivable surface, or otherwise. Moreover, various classifications may be identified as invariant objects, having some known attribute, feature or orientation. As described herein, the semantic segmentation information may separately classify one or more invariant objects, which may include lines, planes, or other known features.

In general, the calibration component 1428 can include functionality to verify calibration of and/or calibrate one or more sensors operating in connection with the sensor pod platform 1402, e.g., one or more of the sensor system(s) 1412. For example, the calibration component 1428 can detect improperly calibrated sensors, schedule calibration routines, and send calibration data to one or more other components of the sensor pod platform 1402 that utilize data produced by the one or more sensors.

The feature detection component 1432 can analyze image data to determine features, e.g., edges, planar surfaces, or the like. Such image features may correspond to, for example, AKAZE, BRISK, SURF, SIFT, ORB, BRIEF, FAST, FREAK, embeddings, and the like. In other examples, the feature detection component 1432 can apply a Canny edge detection algorithm to detect edges in images captured by cameras mounted on the sensor pod platform 1402. In other examples, the feature detection component 1432 can identify edges based on depth discontinuities, e.g., in LiDAR, time-of-flight, and/or other returns having depth information. For example, in implementations described herein, edges detected by the feature detection component 1432 can be compared to semantic segmentation information, e.g., to determine whether the detected edges align with divisions between object classifications identified from the semantic segmentation information.

The error determination component 1434 can include functionality to determine misalignment of features, e.g., features detected by the feature detection component 1432, relative to an expected feature associated with objects identified in the semantic segmentation information, e.g., generated by the semantic segmentation component 1430. For instance, the error determination component can identify a distance between points in sensor data corresponding to a feature and a line, plane, or other feature that represents the expected feature or attribute of the object to which the semantic segmentation information indicates the points are associated. In the instance of an edge or a plane, the error determination component 1434 can include functionality to fit a line or plane to sensed data and determine an error, e.g., offset, of the fit line/plane to the expected return, based on the semantic segmentation information.

The undistort component 1436 can include functionality to undistort sensor returns, e.g., distorted image data, for comparison to attributes of invariant objects and/or invariant features. In some examples, the undistort component 1436 can store calibration data associated with one or more sensors of the sensor pod platform 1402. In some instances, the calibration data can include information about sensor intrinsics. In some instances, the calibration data can include any extrinsic and/or intrinsic information associated with the one or more sensors, including but not limited to, calibration angles, mounting location, height, direction, yaw, tilt, pan, timing information, lens distortion parameters, transmission medium parameters, and the like. Further, the calibration component 1428 can store a log of some or all of the calibration operations performed, such as a time elapsed from the most recent calibration, and the like. As noted above when discussing the example of FIG. 11, calibration error/validation can be carried out using techniques described herein with explicitly undistorting sensor data. In examples, the invariant feature, e.g., the line associated with a pole can be distorted into the distorted space of the image. In at least some examples, an optimization may be performed with respect to an assumed calibration to minimize the error and find an improved calibration.

In some examples, the calibration component 1428, e.g., executing the error determination component 1434, can determine whether a calibration error is significant enough to impact continued use of the sensor. By way of non-limiting example, if an error is equal to or above a threshold error for a sensor, the calibration component 1428 can communicate a sensor failure to other components of the sensor pod platform 1402. For instance, the localization component 1420, the perception component 1422, and/or the planning component 1424 may perform functions at the exclusion of the improperly calibrated sensor. Other functioning may similarly be limited. In other examples, the calibration component 1428 can cause the system controller(s) 1426 to stop the sensor pod platform 1402, for example, when the platform is the vehicle, until sensor calibration can be performed and/or can send information to a remote source, e.g., a teleoperator, to inform of the sensor misalignment and/or request instructions for proceeding.

In some instances, the calibration component 1428 may also include functionality to determine a correction function for correcting the calibration error associated with the sensor system(s) 1412. For example, the calibration component 1428 can use the error determined by the error determination component 1434 to adjust senor data. To correct sensor data, e.g., using a correction function, the calibration component 1428 may consider data from a plurality of frames, returns, or the like, and may consider miscalibration relative to a number of different invariant objects. For instance, while identifying that points are not collinear may be sufficient to identify calibration error, correcting the error may not be accomplished based only on those points. In implementations, errors associated with a number of different invariant objects and/or invariant features may be required to determine a calibration function. Moreover, the relationship of invariant objects may also be considered when determining a calibration function. By way of non-limiting example, when two invariant objects have planes that are expected to be perpendicular, the calibration component 1428 may better develop a calibration function, e.g., by minimizing errors in multiple degrees of freedom. However, additional information may be necessary in further embodiments to accurately determine a calibration function.

In some instances, aspects of some or all of the components discussed herein may include any models, algorithms, and/or machine learning algorithms. For example, in some instances, the components in the memory 1418 (and memory 1446, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

The map(s) 1438 can be used by the sensor pod platform 1402 to determine a location and/or navigate within the environment, when, for example, the platform is a vehicle. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In some examples, the map(s) 1438 can include at least one map (e.g., images and/or a mesh). The sensor pod platform 1402 can be controlled based at least in part on the map(s) 1438. That is, the map(s) 1438 can be used in connection with the localization component 1420, the perception component 1422, the planning component 1424, and/or the calibration component 1428 to determine a location of the sensor pod platform 1402, identify objects in an environment, and/or generate routes and/or trajectories to navigate within an environment. Moreover, and as described herein, the map(s) 1438 can include semantic segmentation information about invariant objects in an environment. By way of non-limiting example, semantic segmentation information contained in maps may be used in addition to, or instead of, semantic segmentation information generated by the semantic segmentation component 1430. In some examples, one or more of the map(s) 1438 may include an aggregation of semantic segmentation information generated using sensor data generated by the sensor pod platform 1402 and/or one or more additional vehicles.

In at least one example, the sensor system(s) 1412 can include LIDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1412 can include multiple instances of each of these or other types of sensors. For instance, the LIDAR sensors (and/or radar sensors) can include individual LIDAR sensors (or radar sensors) located at the corners, front, back, sides, and/or top of the sensor pod platform 1402. As another example, the camera sensors can include multiple cameras disposed at various locations about the exterior and/or interior of the sensor pod platform 1402. The sensor system(s) 1412 can provide input to the computing device 1410. Additionally, or alternatively, the sensor system(s) 1412 can send sensor data, via one or more networks 1440, to one or more remote computing devices at a particular frequency, after a lapse of a predetermined period of time, in near real-time, etc.

In some examples, the sensor system(s) 1412 can be active sensor systems, e.g., that include controls for actively adjusting parameters thereof. For example, some cameras may have adjustable shutter speed or exposure time. Similarly, time-of-flight sensors, LiDAR sensors, radar sensors, and the like may have actively adjustable intensity and/or gain attributes. In some implementations, the semantic segmentation information may be further used to adjust one or more settings of the sensor. For example, when the semantic segmentation information identifies a certain class of type of object in the environment of a sensor, the sensor can be adjusted to optimize sensing of that object. For instance, when certain objects that are expected to have an expected color or brightness are identified from the semantic segmentation information, the intensity of emitted light can be adjusted to optimize sensing.

The processor(s) 1416 of the sensor pod platform 1402 can be any suitable processor capable of executing instructions to process data and perform operations as described herein. By way of example and not limitation, the processor(s) 1416 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1418 is an example of non-transitory computer-readable media. The memory 1418 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 14 is illustrated as a distributed system, in alternative examples, components of the sensor pod platform 1402 can be associated with remote computing devices accessible via the network(s) 1440. For example, the sensor pod platform 1402 can send sensor data to one or more computing device(s) 1442, via the network(s) 1440. In some examples, the sensor pod platform 1402 can send raw sensor data to the computing device(s) 1442. In other examples, the sensor pod platform 1402 can send processed sensor data and/or representations of sensor data to the computing device(s) 1442. In some examples, the sensor pod platform 1402 can send sensor data to the computing device(s) 1442 at a particular frequency, after a lapse of a predetermined period of time, in near real-time, etc. In some cases, the sensor pod platform 1402 can send sensor data (raw or processed) to the computing device(s) 1442 as one or more log files.

The computing device(s) 1442 can receive the sensor data (raw or processed) and can perform calibration operations on the data. In at least one example, the computing device(s) 1442 can include one or more processors 1444 and memory 1446 communicatively coupled with the processor(s) 1444. In the illustrated example, the memory 1446 of the computing device(s) 1442 stores a calibration component 1448, a semantic segmentation component 1450, and/or map(s) 1452. The calibration component 1448 can include functionality to perform operations similar to those discussed above in the context of the calibration component 1428, the semantic segmentation component 1450 can include functionality to perform operations similar to those discussed above in the context of the semantic segmentation component 1430, and the map(s) 1452 may correspond to the map(s) 1438. In some instances, the processor(s) 1444 and the memory 1446 can include functionality and/or structure similar to that discussed above with respect to the processor(s) 1416 and the memory 1418.

Illustrative Cleaning Systems and Techniques

Figure 15:
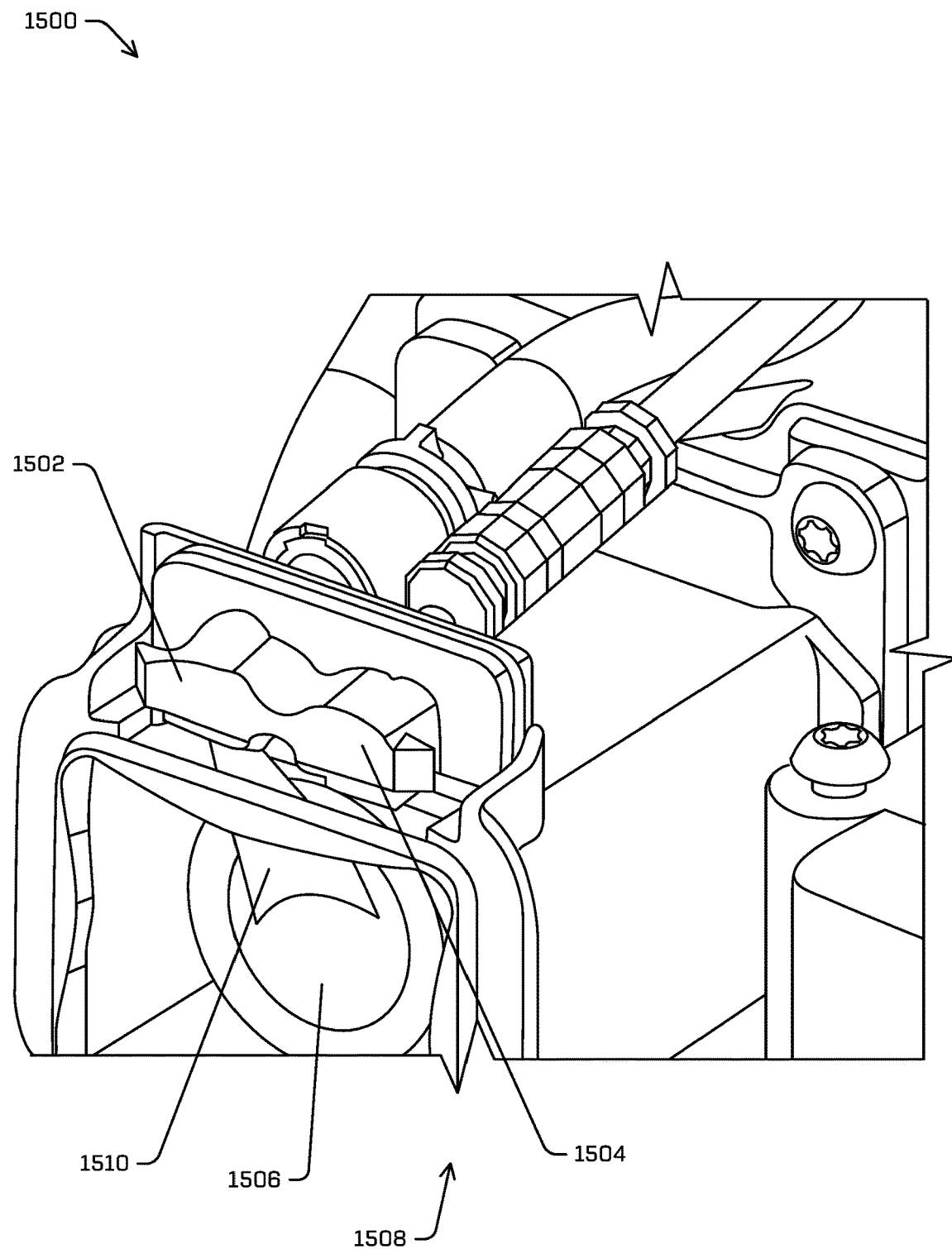
FIG. 15 is a close-up perspective view of portions of FIG. 8.

FIG. 15 shows a view of a cleaning system 1500. In examples, the cleaning system 1500 may include a first nozzle 1502 and a second nozzle 1504 disposed adjacent to and directed at a first sensing surface 1506 of a first sensor 1508.

In examples, the nozzles are configured to direct a fluid on to the sensing surface to clean the sensing surface. For example, the first nozzle 1502 applies a first fluid 1510 onto the first sensing surface 1506. In examples, the first fluid 1510 is applied at an oblique angle compared to the sensing surface. In examples, the second nozzle 1504 is configured to apply another fluid in a similar fashion to clean the sensing surface.

In examples, multiple sensors of a sensor pod have two nozzles directed towards the sensing surface to apply the cleaning fluid. In examples, the cleaning fluid may be the same fluid or may be different. For example, the cleaning fluid may be compressed air, water, detergent, deicer, alcohol, or other liquid agent. In examples, some sensors of the sensor pod may have multiple nozzles directed at the sensing surface where the cleaning fluid is the same. In examples, some sensors of the sensor pod have multiple nozzles directed at the sensing surface where each nozzle applies a different cleaning fluid.

In examples, the cleaning system 1500 include a first manifold and/or reservoir to distribute the cleaning fluid to the nozzle. For example, FIG. 1 shows cleaning system 134 that includes a reservoir, manifold, fluid, pressuring, a pump, valves and controlled by controller 132 to apply the fluid to the sensing surface through the nozzles of one or more nozzles of one or more of the sensor pods. In examples, the cleaning system 134 may have multiple manifolds and reservoirs to control the delivery of multiple fluids.

In examples, the nozzle is configured to apply the fluid, for example, the first fluid 1510, at an oblique angle onto to the sensing surface. For example, the oblique angle may be between 40 degrees and 85 degrees from a perpendicular (normal) direction of the sensing surface. In examples, this allows a more efficient and effective cleaning of the sensing surface. In examples, this placement allows the nozzle to be placed outside of a sensing field of view of the sensor or to obscure only a small portion of the field of view. In examples, the nozzle is disposed adjacent to the sensing surface, but outside of at least a portion of the sensing field of view. In examples, the nozzle is disposed adjacent to the sensing surface, but occludes at least a portion of the sensing field of view. In examples, at least a portion of the portion of the sensing field of view being occluded by the nozzle is also occluded by a portion of the sensor pod other than the nozzle. For example, a portion of the sensor field of view may already be blocked by a portion of the sensor pod, and the nozzle may be placed in the effective shadow of the blocking portion of the sensor pod.

In examples, the sensing surfaces may be different based on the sensors. For example, the sensing surface may include a lens, a shield, a windscreen, a casing, or a radome. In examples, the sensing surface may be an integral part of the associated sensor or a part separate from the associated sensor, and may include any material and/or medium through which an associated sensor may receive a signal indicative of the environment, and thus, may include, but is not limited to, transparent materials, translucent materials, glass, polymers, polycarbonates, and/or combinations thereof. In examples including sensor types such as RADAR, SONAR, and/or other non-optical sensor types, the sensing surface may be opaque and transmissive to signals transmitted and/or received by the sensor.

In examples, the sensor pod also comprises a heater. In examples, each sensor has a heater. In examples, the heaters are electrosensitive heaters that convert electrical energy into heat. In examples, a heater is couple between the sensor and the frame that the sensor is mounted to. In examples, the heater is coupled to the cleaning system 1500. In examples, a heater associated with a sensor may be activated to reduce, eliminate, or aid in cleaning the sensor or maintaining a clean surface. For example, the heater may be used to reduce, eliminate, or aid in the removal of frost or ice that may affect the associated sensor. In examples, the heater may be used in conjunction with one or more of the fluids provided by the nozzles. For example, the heater may be triggered to increase the temperature of the sensor prior to the use of a fluid. In examples, the heater may preheat the sensor to reduce any cooling caused by the later application of fluid. In examples, the heater may increase the temperature of the sensor or sensing surface that may cause any residual fluid provided by a nozzle or other environmental source to evaporate or flash off of the sensor and/or sensing surface.

Figure 16:
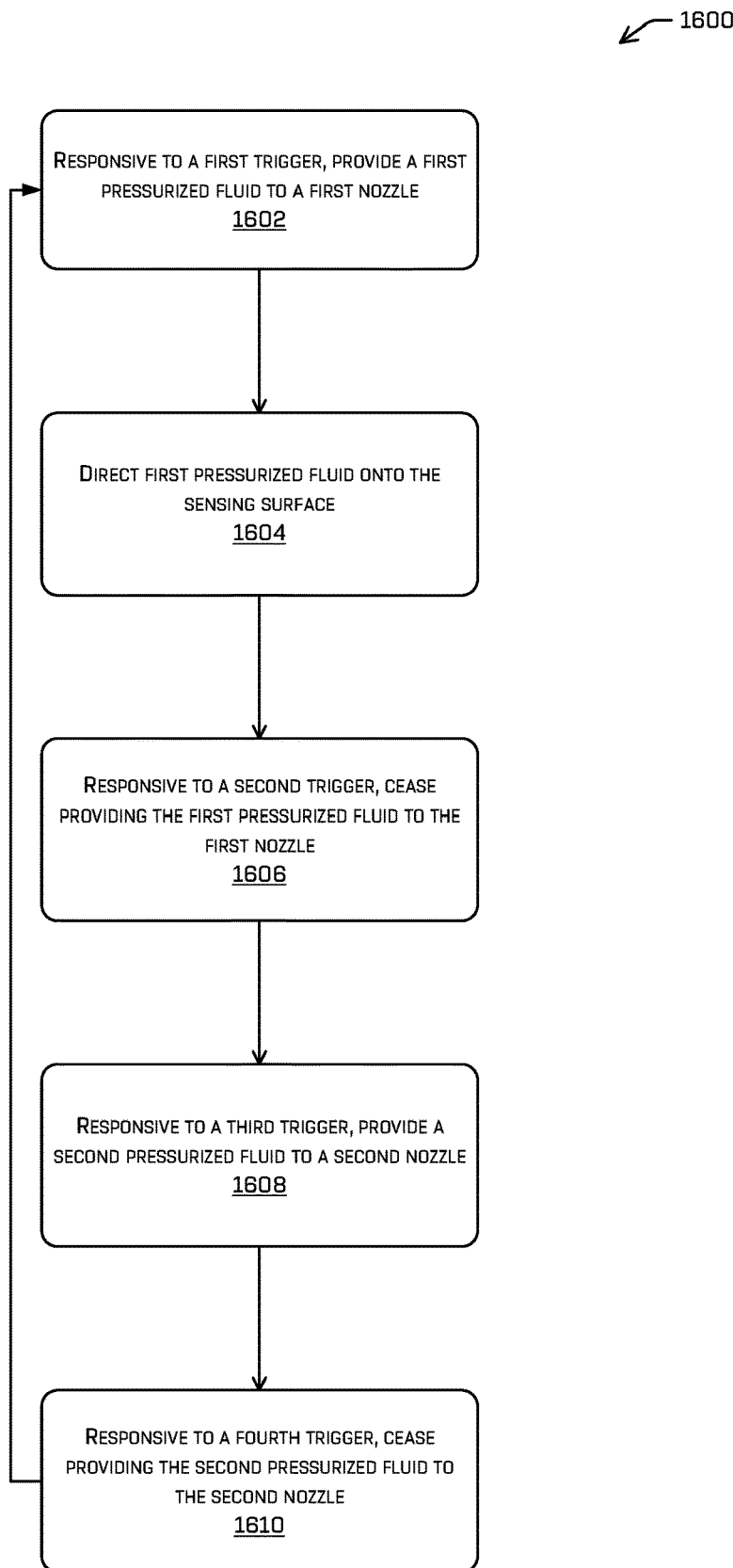
FIG. 16 is an illustration of a process and technique to clean sensors of a sensor pod, in accordance with examples of the disclosure.

FIG. 16 is a flowchart showing an example method and process involving vehicles having sensor pods with cleaning systems. The method illustrated in FIG. 12 is described with reference to one or more of the vehicles, sensor pods, and/or systems shown in FIGS. 1-15 for convenience and ease of understanding. However, the method and process illustrated in FIG. 16 is not limited to being performed using the vehicles, sensor pods, sensors, and/or systems shown in FIGS. 1-15, and may be implemented using any of the other vehicles, sensor pods, and/or systems described in this application, as well vehicles, sensor pods, and/or systems other than those described herein. Moreover, the vehicles, sensor pods, and/or systems described herein are not limited to performing the methods and processes illustrated in FIG. 16.

FIG. 16 depicts an example process 1600 of cleaning a sensor of a sensor pod of a vehicle. At operation 1602, responsive to a first trigger, the cleaning system provides a first pressurized fluid to a first nozzle on the sensor pod. In examples, the first trigger may include an indication that the sensor of the sensor pod requires cleaning, an indication that a threshold time has elapsed since a previous cleaning of the sensor, or a weather forecast indicating a weather event or lack of a weather event.

In some examples, the system may use one or more of the techniques described in U.S. Non-provisional patent application Ser. No. 15/837,953, filed Dec. 11, 2017, U.S. Non-provisional patent application Ser. No. 15/944,240, filed Apr. 3, 2018, and/or U.S. Non-provisional patent application Ser. No. 16/011,335, filed Jun. 18, 2018, the disclosures of which are incorporated herein by reference, to determine that there is an obstruction on the sensor.

In some examples, the sensor may include a first sensor configured to generate one or more first signals indicative of one or more objects detectible in an environment in which the first sensor is present, determining the presence of the obstruction on the surface of the first sensor may include receiving one or more second signals from a second sensor indicative of one or more objects detectible in the environment, and comparing the one or more second signals to the one or more first signals to determine a difference between objects detected by the first sensor and objects detected by the second sensor. For example, the second sensor may detect an object that is not detected by the first sensor, which may be an indication that something is preventing the first sensor from detecting the object, which in turn, may be an indication that at least a portion of the field of view of the first sensor is obstructed by an obstruction that may be on a surface of the first sensor at a position that corresponds, for example, to the object not detected by the first sensor. In some examples, this detection of an obstruction may be confirmed or discounted, for example, according to other methods described herein.

At operation 1604, the first nozzle directs the first pressurized fluid onto the sensing surface of the sensor.

At operation 1606, responsive to a second trigger, the cleaning system ceases to provide the first pressurized fluid to the first nozzle. In examples, the second trigger may include an indication that the sensing surface is clean, or an indication that a threshold application time has elapsed since the first pressurized fluid began being directed onto the sensing surface.

At operation 1608, responsive to a third trigger, the cleaning system may provide a second pressurized fluid to a second nozzle on the sensor pod. In examples the second nozzle may be adjacent to the sensor of the sensor pod. In examples, the second pressurized fluid is different from the first pressurized fluid. In examples, the second pressurized fluid is the same as the first pressurized fluid. In examples, the third trigger may include an indication that the sensor of the sensor pod requires cleaning, an indication that another threshold time has elapsed since a previous cleaning, an indication that the first nozzle has ceased providing the first pressurized fluid, an indication that a liquid is on the sensing surface, an indication that a weather forecast indicates a weather event, or an indication that a weather forecast indicates a lack of a weather event. For example, when the first pressurized fluid is a liquid, a liquid residue may remain on the sensing surface. In examples where the second pressurized fluid is compressed air, the second nozzle may apply the compressed air to blow the residual liquid from the sensing surface. In examples, when the second pressurized fluid is compressed air, the air may be used to remove rain or other liquids on the sensing surface.

At operation 1610, responsive to a fourth trigger, the cleaning system ceases to provide the second pressurized fluid to the second nozzle. In examples, the fourth trigger may include an indication that the sensing surface is clean, or an indication that a threshold application time has elapsed since the second pressurized fluid began being directed onto the sensing surface. The cleaning system may return to operation 1602 when a first trigger is experienced.

In examples, the cleaning system may provide the pressurized fluid from a central reservoir. In these examples, the cleaning system may alternate between the sensors on one pod before alternating between sensors on another pod. In examples, the sensors facing a direction of travel may be prioritized over sensors facing away from a direction of travel.

EXAMPLE CLAUSES

Any of the example clauses in this section may be used with any other of the example clauses and/or any of the other examples or embodiments described herein.

A: A sensor pod comprising: a frame comprising a mounting interface to removably couple the sensor pod to a vehicle; a first sensor removably mounted to a first location of the frame, the first sensor having a first field of view; a second sensor having a second field of view, mounted to a second location of the frame, wherein at least a portion of the first field of view overlaps with at least a portion of the second field of view; and a third sensor having a third field of view, mounted to a third location of the frame, wherein at least a portion of the first field of view and at least a portion of the second field of view overlaps with at least a portion of the third field of view, the first sensor and the second sensor being of a first type and the third sensor being of a second type different than the first type.

B: The sensor pod of paragraph A, wherein: the first type of sensor comprises an imaging sensor; and the second type of sensor comprises a lidar sensor.

C: The sensor pod of paragraphs A or B, further comprising: a fourth sensor removably mounted to a fourth location of the frame, the fourth sensor having a fourth field of view, wherein at least a portion of the second field of view and a portion of the third field of view overlaps with at least a portion of the fourth field of view; and a fifth sensor having a fifth field of view, mounted to a fifth location of the frame, wherein at least a portion of the fourth field of view overlaps with at least a portion of the fifth field of view.

D: The sensor pod of any one of paragraphs A-C, wherein the first sensor comprises a first camera oriented with an optical axis in a first direction, the second sensor comprises a second camera oriented with an optical axis in a second direction, the fourth sensor comprises a third camera oriented with an optical axis in a third direction substantially opposite the first direction, wherein the second direction is between the first direction and the third direction, and the first field of view and the second field of view are different than the third field of view.

E: The sensor pod of any one of paragraphs A-D, the frame comprising a cast frame, the cast frame comprising: a first cast surface at the first location configured to support the first sensor; a second cast surface at the second location configured to support the second sensor; and a third cast surface at the third location configured to support the third sensor.

F: The sensor pod of any one of paragraphs A-E, the cast frame further comprising a cast mounting surface at a sixth location configured to mount the sensor pod to the vehicle.

G: The sensor pod of any one of paragraphs A-F, further comprising a cleaning system to clean one or more sensors, the cleaning system comprising multiple types of fluids applicable to at least one sensor of the sensor pod.

H: The sensor pod of any one of paragraphs A-G, further comprising a supply harness coupleable to the vehicle, the supply harness comprising a liquid connection and a pressurized air connection to supply fluid and pressurized air to the cleaning system and a power connection to supply power to one or more of the sensors.

I: The sensor pod of any one of paragraphs A-H, further comprising: a sensor harness electrically coupleable to the vehicle and electrically coupled to the first sensor, second sensor, third sensor, fourth sensor, and fifth sensor to transmit sensor data from the first sensor, second sensor, third sensor, fourth sensor, and fifth sensor to a computing system of the vehicle.

J: The sensor pod of any one of paragraphs A-I, wherein the sensor pod is asymmetric wherein the mounting interface is located at a sixth location disposed substantially opposite the second location, and wherein, a sensor pod mount, coupled to the vehicle, protrudes from a side of the sensor pod.

K: A vehicle comprising: a body having four quadrants; two sensor pods, a sensor pod of the two sensor pods disposed at a different quadrant of the four quadrants of the vehicle and coupled to the vehicle through a mounting arm, sensor pods of the two sensor pods comprising: a frame comprising a mounting interface removably coupled to the mounting arm; a first sensor removably mounted to a first location of the frame, the first sensor having a first field of view; a second sensor having a second field of view, mounted to a second location of the frame, wherein the first field of view overlaps with at least a portion of the second field of view, the second location disposed substantially opposite the mounting arm; a third sensor having a third field of view, mounted to a third location of the frame, wherein at least a portion of the second field of view overlaps with at least a portion of the third field of view; and a fourth sensor removably mounted to a fourth location of the frame, the fourth sensor having a fourth field of view, wherein at least a portion of the first field of view, a portion of the second field of view, and a portion of the third field of view overlaps with at least a portion of the fourth field of view.

L: The vehicle of paragraph K, wherein the first sensor, the second sensor, and the third sensor are of a first type and the fourth sensor is of a second type.

M: The vehicle of paragraph K or L, wherein: the body has a first lateral side and a second lateral side and a first longitudinal end and a second longitudinal end, a first sensor pod is disposed at a first quadrant of the vehicle which is at the first lateral side and the first longitudinal end; a second sensor pod is disposed at a second quadrant of the vehicle which is at the second lateral side and the first longitudinal end; a third sensor pod is disposed at a third quadrant of the vehicle which is at the first lateral side and the second longitudinal end; a fourth sensor pod is disposed at a fourth quadrant of the vehicle which is at the second lateral side and the second longitudinal end; and the first sensor pod and the fourth sensor pod have a first shape, and the second sensor pod and the third sensor pod have a second shape which is a mirror image of the first shape.

N: A system comprising: a frame comprising a mounting interface removably coupling the system to a mounting arm of a vehicle; a first sensor removably mounted to a first location of the frame, the first sensor having a first field of view; a second sensor having a second field of view, mounted to a second location of the frame, wherein at least a portion of the first field of view overlaps with at least a portion of the second field of view, the second location disposed substantially opposite the mounting arm; and a third sensor having a third field of view, mounted to a third location of the frame, wherein at least a portion of the second field of view overlaps with at least a portion of the third field of view, the first sensor and the second sensor being of a first type and the third sensor being of a second type different than the first type.

O: The system of paragraph N, wherein: the first type of sensor comprises an imaging sensor; and the second type of sensor comprises a lidar sensor.

P: The system of paragraph N or O, further comprising a fourth sensor removably mounted to a fourth location of the frame, the fourth sensor having a fourth field of view, wherein at least a portion of the second field of view overlaps with at least a portion of the fourth field of view.

Q: The system of any one of paragraphs N-P, wherein the first sensor comprises a first camera oriented with an optical axis in a first direction, the second sensor comprises a second camera oriented with an optical axis in a second direction, the fourth sensor comprises a third camera oriented with an optical axis in a third direction substantially opposite the first direction, wherein the second direction is between the first direction and the third direction, and the first field of view and second field of view are different than the third field of view.

R: The system of any one of paragraphs N-Q, the frame comprising a cast frame, the cast frame comprising: a first cast surface at the first location configured to support the first sensor; a second cast surface at the second location configured to support the second sensor; a third cast surface at the third location configured to support the third sensor; and a cast mounting surface at a sixth location configured to mount the system to the vehicle, wherein the first sensor is mounted relative to the second sensor below a first tolerance threshold, and the second sensor is mounted relative to the vehicle below a second tolerance threshold.

S: The system of any one of paragraphs N-R, further comprising a cleaning system to clean one or more sensors, the cleaning system comprising multiple types of fluids applicable to at least one sensor.

T: The system of any one of paragraphs N-S, further comprising a supply harness coupleable to the vehicle, the supply harness comprising a liquid connection and a pressurized air connection to supply fluid and pressurized air to the cleaning system and a power connection to supply power to one or more of the sensors.

U: A vehicle comprising: a body having a first end and a second end distal to the first end along a longitudinal axis; a first sensor pod, comprising multiple sensors disposed in a first sensor pod housing, the first sensor pod removably coupled to the body at a first location, the first location adjacent to the first end spaced from the longitudinal axis in a first direction along a first transverse axis, at an elevation above a ground interface; a second sensor pod, comprising multiple sensors disposed in a second sensor pod housing, the second sensor pod removably coupled to the body at a second location, the second location adjacent to the first end spaced from the longitudinal axis in a second direction, opposite the first direction along the first transverse axis, at the elevation; a third sensor pod, comprising multiple sensors disposed in a third sensor pod housing, the third sensor pod removably coupled to the body at a third location, the third location adjacent to the second end spaced from the longitudinal axis in the first direction, along a second transverse axis, at the elevation; and a fourth sensor pod, comprising multiple sensors disposed in a fourth sensor pod housing, the fourth sensor pod removably coupled to the body at a fourth location, the fourth location adjacent to the second end spaced from the longitudinal axis in the second direction, opposite the first direction along the second transverse axis, at the elevation, wherein: the first sensor pod has a first effective sensor field of view, the second sensor pod has a second effective sensor field of view, the third sensor pod has a third effective sensor field of view, and the fourth sensor pod has a fourth effective sensor field of view; the first effective sensor field of view overlapping with a least a portion of the second effective sensor field of view and with at least a portion of the third effective sensor field of view; the second effective sensor field of view overlapping with a least a portion of the first effective sensor field and with at least a portion of the fourth effective sensor field of view; the third effective sensor field of view overlapping with a least a portion of the first effective sensor field of view and with at least a portion of the fourth effective sensor field of view; and the fourth effective sensor field of view overlapping with a least a portion of the second effective sensor field of view and with at least a portion of the third effective sensor field.

V: The vehicle of paragraph U, the first effective sensor field of view of the first sensor pod overlapping with a least a portion of the fourth effective sensor field of view of the fourth sensor pod.

W: The vehicle of paragraphs U or V, wherein fields of view of the first effective sensor field of view, the second effective sensor field of view, the third effective sensor field of view, and the fourth effective sensor field of view is between 260 and 280 degrees.

X: The vehicle of any one of paragraphs U-W, wherein the first effective sensor field of view, the second effective sensor field of view, the third effective sensor field of view, and the fourth effective sensor field of view collectively provide an effective vehicle field of view of 360 degrees at a first distance from the vehicle.

Y: The vehicle of any one of paragraphs U-X, wherein the first sensor pod protrudes at least an eight inch distance from the first end and at least an eight inch distance from a lateral side of the body.

Z: The vehicle of any one of paragraphs U-Y, wherein at least three of the first effective sensor field of view, the second effective sensor field of view, the third effective sensor field of view, or the fourth effective sensor field of view collectively provide an effective vehicle field of view of 360 degrees at a first distance from the vehicle.

AA: The vehicle of any one of paragraphs U-Z, wherein one or more sensor pods protrude at least an eight inch distance from a longitudinal end and at least an eight inch distance from a lateral side of the body of the vehicle.

BB: The vehicle of any one of paragraphs U-AA, the elevation above four feet and below one foot above of a top of the body.

CC: The vehicle of any one of paragraphs U-BB, the first sensor pod and third sensor pod comprising a first type of sensor pod, the second sensor pod and fourth sensor pod comprising a second type of sensor pod, the second type of sensor pod being a mirror image of the first type of sensor pod.

DD: The vehicle of any one of paragraphs U-CC, further comprising another sensor disposed on the body separate from the first sensor pod, the second sensor pod, the third sensor pod, and the fourth sensor pod, wherein the other sensor has a fifth field of view, which overlaps with at least a portion of two of the first effective sensor field of view, the second effective sensor field of view, the third effective sensor field of view, or the fourth effective sensor field of view.

EE: The vehicle of any one of paragraphs U-DD, wherein the first location is within a first distance of the first end and the spacing from the longitudinal axis of the first location is greater than a second distance from the longitudinal axis, such that the effective sensor field of view of the first sensor pod includes a view of an object behind an obstacle located at a first position relative to and spaced from the vehicle.

FF: A sensor system comprising: a first sensor pod, comprising multiple sensors disposed in a first sensor pod housing, the first sensor pod, removably coupleable to a vehicle body at a first location, the first location adjacent to a first end spaced from a longitudinal axis of the body in a first direction along a first transverse axis, at an elevation above a ground interface; a second sensor pod, comprising multiple sensors disposed in a second sensor pod housing, the second sensor pod removably coupleable to the body at a second location, the second location adjacent to the first end spaced from the longitudinal axis in a second direction, opposite the first direction along the first transverse axis, at the elevation; a third sensor pod, comprising multiple sensors disposed in a third sensor pod housing, the third sensor pod removably coupleable to the body at a third location, the third location adjacent to a second end spaced from the longitudinal axis in the first direction, along a second transverse axis, at the elevation, the second end distal to the first end along the longitudinal axis; and a fourth sensor pod, comprising multiple sensors disposed in a fourth sensor pod housing, the fourth sensor pod removably coupleable to the body at a fourth location, the fourth location adjacent to the second end spaced from the longitudinal axis in the second direction, opposite the first direction along the second transverse axis, at the elevation, wherein: the first sensor pod has a first effective sensor field of view, the second sensor pod has a second effective sensor field of view, the third sensor pod has a third effective sensor field of view, and the fourth sensor pod has a fourth effective sensor field of view; the first effective sensor field of view overlapping with a least a portion of the second effective sensor field of view and with at least a portion of the third effective sensor field of view;

the second effective sensor field of view overlapping with a least a portion of the first effective sensor field and with at least a portion of the fourth effective sensor field of view; the third effective sensor field of view overlapping with a least a portion of the first effective sensor field of view and with at least a portion of the fourth effective sensor field of view; and the fourth effective sensor field of view overlapping with a least a portion of the second effective sensor field of view and with at least a portion of the third effective sensor field.

GG: The sensor system of paragraph FF, the first effective sensor field of view of the first sensor pod overlapping with a least a portion of the fourth effective sensor field of view of the fourth sensor pod at a first distance from the vehicle.

HH: The sensor system of paragraph FF or GG, wherein the first effective sensor field of view, the second effective sensor field of view, the third effective sensor field of view, and the fourth effective sensor field of view collectively provide an effective vehicle field of view of 360 degrees at a first distance from the vehicle.

II: The sensor system of any one of paragraphs FF-HH, wherein the first effective sensor field of view, the second effective sensor field of view, the third effective sensor field of view, and the fourth effective sensor field of view are at least 270 degrees.

JJ: The sensor system of any one of paragraphs FF-II, wherein at least three of the first effective sensor field of view, the second effective sensor field of view, the third effective sensor field of view, or the fourth effective sensor field of view collectively provide an effective vehicle field of view of 360 degrees at a first distance from the vehicle.

KK: The sensor system of any one of paragraphs FF-JJ, wherein one or more sensor pods protrude at least an eight inch distance from a longitudinal end and at least an eight inch distance from a lateral side of the body of the vehicle.

LL: The sensor system of any one of paragraphs FF-KK, the first sensor pod and third sensor pod comprising a first type of sensor pod, the second sensor pod and fourth sensor pod comprising a second type of sensor pod, the second type of sensor pod being a mirror image of the first type of sensor pod.

MM: The sensor system of any one of paragraphs FF-LL, further comprising another sensor disposed on the body separate from the first sensor pod, the second sensor pod, the third sensor pod, and the fourth sensor pod, wherein the other sensor has a fifth field of view, which overlaps with at least a portion of two of the first effective sensor field of view, the second effective sensor field of view, the third effective sensor field of view, or the fourth effective sensor field of view.

NN: A vehicle comprising: a body having a first longitudinal end and a second longitudinal end distal to the first longitudinal end along a longitudinal axis; and a sensor pod removably coupled to the body, the sensor pod protruding at least an eight inch distance from the longitudinal end and at least an eight inch distance from a lateral side of the body of the vehicle, and at an elevation above a ground interface, the elevation above five feet and within two feet of atop of the body, sensor pod comprising a first sensor of a first type and a second sensor of a second type.

OO: The vehicle of paragraph NN, wherein the sensor pod has an effective field of view of greater than 270 degrees.

PP: A sensor pod comprising: a frame coupleable to a vehicle; a sensor coupled to the frame; an impact structure coupled to the frame, the impact structure comprising: an outer surface configured to interface with a pedestrian during an impact, at least a portion of the outer surface disposed outboard of the sensor relative to the frame; and an impact energy absorbing structure disposed between the outer surface and frame and configured to absorb a portion of energy transferred through the outer surface from the impact.

QQ: The sensor pod of paragraph PP, the impact energy absorbing structure comprising a stress concentration zone during impact, the stress concentration zone configured to cause local plastic deformation of the impact energy absorbing structure to absorb energy from the impact.

RR: The sensor pod of paragraph PP or QQ, the stress concentration zone configured to cause local plastic deformation above a first impact force threshold and below a second impact force threshold.

SS: The sensor pod of any one of paragraphs PP-RR, the outer surface configured to move substantially uniformly with respect to the frame during the impact.

TT: The sensor pod of any one of paragraphs PP-SS, the outer surface comprising a thickness being configured to plastically deform above a first impact force threshold and below a second impact force threshold during impact.

UU: The sensor pod of any one of paragraphs PP-TT, the outer surface being substantially convex.

VV: The sensor pod of any one of paragraphs PP-UU, the outer surface being substantially convex in two orthogonal directions.

WW: The sensor pod of any one of paragraphs PP-VV, further comprising another sensor disposed above the frame and coupled to the frame by a deformable fastener.

XX: The sensor pod of any one of paragraphs PP-WW, the deformable fastener comprising a stress concentration zone to cause local plastic deformation of the deformable fastener to absorb energy from the impact; and the deformable fastener configured to release the other sensor when the impact exceeds a third impact force threshold.

YY: The sensor pod of any one of paragraphs PP-XX, further comprising a baffle structure disposed between the sensor and the outer surface, the baffle structure comprising a crumple zone configured to plastically deform during an impact and absorb energy from the impact.

ZZ: A system comprising: a frame coupleable to a vehicle; a sensor coupled to the frame; an impact structure coupled to the frame, the impact structure comprising: an outer surface configured to interface with a pedestrian during an impact, at least a portion of the outer surface disposed outboard of the sensor relative to the frame; and an impact energy absorbing structure disposed between the outer surface and frame and configured to absorb a portion of energy transferred through the outer surface from the impact.

AAA: The system of paragraph ZZ, the impact energy absorbing structure comprising a stress concentration zone during impact, the stress concentration zone configured to cause local plastic deformation of the impact energy absorbing structure to absorb energy from the impact.

BBB: The system of paragraph ZZ or AAA, the stress concentration zone configured to cause local plastic deformation above a first impact force threshold and below a second impact force threshold.

CCC: The system of any one of paragraphs ZZ-BBB, the outer surface configured to move substantially uniformly with respect to the frame during the impact.

DDD: The system of any one of paragraphs ZZ-CCC, the outer surface being substantially convex in two orthogonal directions.

EEE: A vehicle comprising: a vehicle body; a sensor pod protruding from the vehicle body, the sensor pod comprising: a frame coupleable to the vehicle; a sensor coupled to the frame; an impact structure coupled to the frame, the impact structure comprising: an outer surface configured to interface with a pedestrian during an impact, at least a portion of the outer surface disposed outboard of the sensor relative to the frame; and an impact energy absorbing structure disposed between the outer surface and frame and configured to absorb a portion of energy transferred through the outer surface from the impact.

FFF: The vehicle of paragraph EEE, further comprising another sensor pod protruding from the vehicle body, wherein the sensor pod protrudes from a first quadrant of the vehicle body and the other sensor pod protrudes from a second quadrant of the vehicle body.

GGG: The vehicle of paragraph EEE or FFF, wherein the sensor pod is a first sensor pod protruding from a first quadrant of the vehicle body, a second sensor pod protruding from the vehicle body at a second quadrant of the vehicle body.

HHH: The vehicle of any one of paragraphs EEE-GGG, the impact energy absorbing structure comprising a stress concentration zone during impact, the stress concentration zone configured to cause local plastic deformation of the impact energy absorbing structure to absorb energy from the impact.

III: The vehicle of any one of paragraphs EEE-HHH, the stress concentration zone configured to cause local plastic deformation above a first impact force threshold and below a second impact force threshold.

JJJ: A system comprising: a frame comprising a vehicle mounting interface, a first mounting location and a second mounting location; a first sensor coupled to the frame at the first mounting location; a second sensor coupled to the frame at the second mounting location; one or more processors; and non-transitory computer-readable media storing one or more instructions that, when executed, cause the one or more processors to perform acts comprising: receiving, from the first sensor, first sensor data of an environment of the system; receiving, from the second sensor, second sensor data of the environment of the system; segmenting, as first segmented data, the first sensor data based at least in part on a representation of a first invariant object in the first sensor data; segmenting, as second segmented data, the second sensor data based at least in part on a representation of a second invariant object in the second sensor data; determining, based at least in part on the first segmented data, a subset of the first sensor data associated with the first invariant object; determining, based at least in part on the second segmented data, a subset of the second sensor data associated with the second invariant object; determining, based at least in part on the subset of the first sensor data, a first calibration error associated with the first sensor; determining, based at least in part on the subset of the second sensor data, a second calibration error associated with the second sensor; and determining, based at least in part on the first calibration error associated with the first sensor and the second calibration error associated with the second sensor, a system calibration factor associated with the system.

KKK: The system of paragraph JJJ, further comprising a mount coupled to the frame at the vehicle mounting interface, the mount fixed relative to the environment.

LLL: The system of paragraphs JJJ or KKK, the environment containing the first invariant within a 90-degree field of view.

MMM: The system of any one of paragraphs JJJ-LLL, the mount having indexed orientations, the first sensor data received at a first index, the second sensor data received at a second index, the determining further based at least in part on the first index orientation and the second index orientation.

NNN: The system of any one of paragraphs JJJ-MMM, further comprising a third sensor coupled to the frame at a third mounting location; and the acts further comprising: receiving, from the third sensor, third sensor data of the environment of the system; segmenting, as third segmented data, the third sensor data based at least in part on a representation of a third invariant object in the third sensor data; determining, based at least in part on the third segmented data, a subset of the third sensor data associated with the third invariant object; determining, based at least in part on the subset of the third sensor data, a third calibration error associated with the third sensor; and the determining the system calibration factor associated with the system being further based at least in part on the third calibration error associated with the third sensor.

OOO: The system of any one of paragraphs JJJ-NNN, wherein: the mount has indexed orientations; the first sensor data and second sensor data received with the frame oriented at a first index; the third sensor data received with the frame oriented at a second index; the acts further comprising: receiving fourth sensor data from the second sensor with the frame at a second index; and the determining the system calibration factor associated with the system being further based at least in part on the third sensor data and the fourth sensor data.

PPP: The system of any one of paragraphs JJJ-OOO, the first invariant being the same as the second invariant.

QQQ: The system of any one of paragraphs JJJ-PPP, the first invariant comprising a fiducial, a portion of a building, wall, corner, pole, window, roof/ceiling line, wall-ceiling/roof intersection, or combinations thereof.

RRR: The system of any one of paragraphs JJJ-QQQ, wherein the first sensor is a different type of sensor from the second sensor.

SSS: The system of any one of paragraphs JJJ-RRR, wherein the first sensor comprises a camera, and the second sensor comprises a lidar.

TTT: The system of any one of paragraphs JJJ-SSS, the acts further comprising: receiving, from a sensor pod, sensor pod data representative of a third invariant; determining, based at least in part on the sensor pod data, a sensor pod calibration factor; and determining, based at least in part on the system calibration factor and the sensor pod calibration factor, whether the sensor pod is compatible with the first sensor and the second sensor mounted to the frame, when the sensor pod and the frame are mounted to a vehicle.

UUU: A vehicle comprising: a sensor pod comprising a first sensor and a second sensor; one or more processors; and non-transitory computer-readable media storing one or more instructions that, when executed, cause the one or more processors to perform acts comprising: receiving, from the first sensor, sensor data of an environment of the vehicle; segmenting, as segmented data, the sensor data based at least in part on a representation of an invariant object in the sensor data; determining, based at least in part on the segmented data, a subset of the sensor data associated with the invariant object; determining, based at least in part on the subset of the sensor data, a calibration error associated with the first sensor; and determining, based at least in part on the calibration error and a sensor pod calibration factor, an estimated calibration error associated with the second sensor.

VVV: The vehicle of the paragraph of UUU, wherein the sensor pod calibration factor is based at least in part on a first calibration error associated with the first sensor based at least in part on first data received from the first sensor, representative of a first invariant, and a second calibration error associated with the second sensor based at least in part on second data received from the second sensor, representative of a second invariant.

WWW: The vehicle of paragraph UUU or VVV, wherein the first invariant is the same as the second invariant.

XXX: The vehicle of any one of paragraphs UUU-WWW, wherein the first sensor comprises a camera, and the second sensor comprises a lidar.

YYY: The vehicle of any one of paragraphs UUU-XXX, the acts further comprising: receiving, from another sensor pod, sensor pod data representative of a third invariant; determining, based at least in part on the sensor pod data, another sensor pod calibration factor; and determining, based at least in part on the sensor pod calibration factor and the other sensor pod calibration factor, whether the sensor pod and the other sensor pod have compatible effective fields of view when the sensor pod and the other sensor pod are mounted to the vehicle.

ZZZ: A method comprising: receiving, from a first sensor pod, first sensor data representative of a first invariant; determining, based at least in part on the first sensor data, a first calibration factor; receiving, from a second sensor pod, second sensor data representative of a second invariant; determining, based at least in part on the second sensor data, a second calibration factor; and determining, based at least in part on the first calibration factor and the second calibration factor, whether the first sensor pod and the second sensor pod have compatible effective fields of view.

AAAA: The method of paragraph ZZZ, further comprising pairing the first sensor pod with the second sensor pod for installation on a vehicle when determined to have compatible effective fields of view.

BBBB: The method of paragraph ZZZ or AAAA, further comprising installing, when determined to have compatible fields of view, the first sensor pod on a vehicle where the second on a vehicle is already installed.

CCCC: The method of any one of paragraphs ZZZ-BBBB, wherein the first sensor data comprises data from a plurality of sensors of the first sensor pod.

DDDD: A sensor pod comprising: a first sensor coupled to a frame, the first sensor having a first sensing surface and a sensing field of view; a first nozzle disposed adjacent to and directed at the first sensing surface, the first nozzle configured to apply a first fluid to the first sensing surface to clean the first sensing surface; a second nozzle disposed adjacent to and directed at the first sensing surface, the second nozzle configured to apply a second fluid to the first sensing surface to clean the first sensing surface; a second sensor coupled to the frame, the second sensor having a second sensing surface and a sensing field of view; a third nozzle disposed adjacent to and directed at the second sensing surface, the third nozzle configured to apply the first fluid to the second sensing surface to clean the second sensing surface; a fourth nozzle disposed adjacent to and directed at the second sensing surface, the fourth nozzle configured to apply the second fluid to the second sensing surface to clean the second sensing surface; a first manifold to distribute the first fluid to the first nozzle and the third nozzle; and a second manifold to distribute the second fluid to the second nozzle and the fourth nozzle.

EEEE: The sensor pod of paragraph DDDD, wherein the first fluid comprises air, liquid, water, detergent, cleaning solution, deicer, or alcohol, and the second fluid comprises air, liquid, water, detergent, cleaning solution, deicer, or alcohol.

FFFF: The sensor pod of paragraphs DDDD or EEEE, wherein the first fluid is different than the second fluid.

GGGG: The sensor pod of any one of paragraphs DDDD-FFFF, the first nozzle configured to apply the fluid at an oblique angle to the first sensing surface.

HHHH: The sensor pod of any one of paragraphs DDDD-GGGG, the first fluid provided to the first sensing surface from a reservoir providing fluid to another sensor pod.

IIII: The sensor pod of any one of paragraphs DDDD-HHHH, the nozzle disposed adjacent to the sensing surface outside of the sensing field of view.

JJJJ: The sensor pod of any one of paragraphs DDDD-IIII, the nozzle disposed within the sensing field of view and behind a portion of the sensor pod that at least partially obstructs the sensing field of view.

KKKK: The sensor pod of any one of paragraphs DDDD-JJJJ, further comprising one or more additional nozzles spaced at substantially equal distances around the sensor, sensing surface, or field of view.

LLLL: The sensor pod of any one of paragraphs DDDD-KKKK, the sensing surface comprising a lens, a shield, a windscreen, a casing, or a radome.

MMMM: The sensor pod of any one of paragraphs DDDD-LLLL, further comprising a supply harness coupleable to a vehicle, the supply harness comprising one or more of power, liquid, or pressurized air.

NNNN: A method of operating a sensor pod comprising: responsive to a first trigger, providing a pressurized fluid to a nozzle on the sensor pod, the nozzle adjacent to a sensor of the sensor pod; directing the pressurized fluid through the nozzle onto a sensing surface of the sensor; and responsive to a second trigger, ceasing to provide the pressurized fluid to the nozzle.

OOOO: The method of paragraph NNNN, further comprising: receiving first sensor data indicating a first condition; generating, based at least in part on the first sensor data, a first signal indicating the first trigger, wherein the providing the pressurized fluid is based at least in part on the first signal; receiving second sensor data indicating a second condition; and generating, based at least in part on the second sensor data, a second signal indicating the second trigger, wherein the ceasing to provide the pressurized fluid is based at least in part on the second signal.

PPPP: The method of paragraphs NNNN or OOOO, wherein the first trigger comprises one or more of an indication that a sensor of the sensor pod requires cleaning, an indication that a threshold time has elapsed since a previous cleaning, or a weather forecast.

QQQQ: The method of any one of paragraphs NNNN-PPPP, wherein the second trigger comprises an indication that the sensing surface is clean, or an indication that a threshold application time has elapsed since the pressurized fluid began being directed onto the sensing surface.

RRRR: The method of any one of paragraphs NNNN-QQQQ, further comprising: responsive to a third trigger, providing another pressurized fluid to another nozzle on the sensor pod, the other nozzle adjacent to the sensor of the sensor pod; directing the other pressurized fluid through the other nozzle onto the sensing surface of the sensor; and responsive to a fourth trigger, ceasing to provide the other pressurized fluid to the other nozzle.

SSSS: The method of any one of paragraphs NNNN-RRRR, wherein the third trigger comprises an indication that the sensor of the sensor pod requires cleaning, an indication that another threshold time has elapsed since a previous cleaning, an indication that the nozzle has ceased providing the pressurized fluid, or an indication that a liquid is on the sensing surface.

TTTT: The method of any one of paragraphs NNNN-SSSS, wherein the fourth trigger comprises an indication that the sensing surface is clean, or an indication that a threshold application time has elapsed since the other pressurized fluid began being directed onto the sensing surface.

UUUU: The method of any one of paragraphs NNNN-TTTT, wherein: the first trigger comprises an indication that a sensor of the sensor pod requires cleaning, or an indication that a threshold time has elapsed since a previous cleaning, the second trigger comprises an indication that the sensing surface is clean, or an indication that a threshold application time has elapsed since the pressurized fluid began being directed onto the sensing surface; the third trigger comprises an indication that the sensor of the sensor pod requires cleaning, an indication that another threshold time has elapsed since a previous cleaning, an indication that the nozzle has ceased providing the pressurized fluid, or an indication that a liquid is on the sensing surface; and the fourth trigger comprises an indication that the sensing surface is clear, or an indication that a threshold application time has elapsed since the other pressurized fluid began being directed onto the sensing surface.

VVVV: The method of any one of paragraphs NNNN-UUUU, wherein the pressurized fluid comprises a liquid, and the other pressurized fluid comprises compressed air.

WWWW: A system comprising: a sensor pod comprising multiple sensors, a sensor of the multiple sensors having a sensing surface; multiple nozzles disposed at the sensor, a first nozzle of the multiple nozzles configured to apply a first fluid and a second nozzle of the multiple nozzles configured to apply a second fluid; a manifold to distribute the fluid to the multiple sensors.)

(XXX: The system of paragraph WWWW, wherein the first nozzle is configured to apply the fluid at an oblique angle to the sensing surface.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A sensor pod comprising:
    a frame configured parallel to a horizontal plane of the sensor pod and accommodating a plurality of sensors;
    a first sensor coupled to the frame, the first sensor extending radially outward from a center of the sensor pod in a first direction parallel to the horizontal plane and having a first sensing surface facing outward that is substantially perpendicular to the horizontal plane and a first sensing field of view;
    a first baffle structure longitudinally disposed around a first periphery of the first sensor the first baffle structure comprising a first crumple zone configured to absorb energy from a first force of a first impact and plastically deforming during the first impact when the first impact force is greater than a first impact force threshold;
    a first nozzle coupled to the first baffle structure and disposed adjacent to and directed at the first sensing surface, the first nozzle configured to apply a first fluid to the first sensing surface to clean the first sensing surface;
    a second nozzle coupled to the first baffle structure and disposed adjacent to and directed at the first sensing surface, the second nozzle configured to apply a second fluid to the first sensing surface to clean the first sensing surface based at least in part on detecting a first indication that the first nozzle has ceased applying the first fluid to the first sensing surface;
    a second sensor coupled to the frame, the second sensor extending radially outward from the center of the sensor pod in a second direction distinct from the first direction parallel the horizontal plane and having a second sensing surface facing outward that is substantially perpendicular to the horizontal plane and a second sensing field of view;
    a second baffle structure longitudinally disposed around a second periphery of the second sensor, the second baffle structure comprising a second crumple zone configured to absorb energy from a second force of a second impact and plastically deforming during the second impact when the second impact force is greater than a second impact force threshold;
    a third nozzle coupled to the second baffle structure and disposed adjacent to and directed at the second sensing surface, the third nozzle configured to apply the first fluid to the second sensing surface to clean the second sensing surface;
    a fourth nozzle coupled to the second baffle structure and disposed adjacent to and directed at the second sensing surface, the fourth nozzle configured to apply the second fluid to the second sensing surface to clean the second sensing surface based at least in part on detecting a second indication that the third nozzle has ceased applying the first fluid to the second sensing surface;
    a first manifold configured to distribute the first fluid to the first nozzle and the third nozzle;
    a second manifold configured to distribute the second fluid to the second nozzle and the fourth nozzle;
    a first cylindrical sensor extending outwardly from a top surface of the sensor pod along a vertical axis of the sensor pod; and a second cylindrical sensor extending outwardly from a bottom surface of the sensor pod at an angle to the vertical axis of the sensor pod.

2. The sensor pod of claim 1, wherein the first fluid comprises air, liquid, water, detergent, cleaning solution, deicer, or alcohol, and the second fluid comprises air, liquid, water, detergent, cleaning solution, deicer, or alcohol.

3. The sensor pod of claim 1, wherein the first fluid is a liquid and the second fluid is air.

4. The sensor pod of claim 1, wherein the first nozzle is configured to apply the first fluid at an oblique angle to the first sensing surface.

5. The sensor pod of claim 1, wherein the first crumple zone is further configured to plastically deform during the first impact when the first impact force less than a third impact force threshold that is greater than the first impact force threshold.

6. The sensor pod of claim 1, wherein the first nozzle is disposed adjacent to the first sensing surface outside of the first sensing field of view.

7. The sensor pod of claim 1, wherein the first indication and the second indication are received from a sensor cleaning system communicatively coupled to the sensor pod.

8. The sensor pod of claim 7, wherein at least one of the first indication or the second indication is based at least in part on one or more of:
an elapse of a threshold amount of time; or
a cessation of application of the first fluid.

9. The sensor pod of claim 1, wherein the first sensing surface comprises a lens, a shield, a windscreen, a casing, or a radome.

10. The sensor pod of claim 1, further comprising a supply harness coupleable to a vehicle, the supply harness comprising one or more of power, liquid, or pressurized air.

11. A system comprising:
a sensor pod comprising a horizontal plane accommodating multiple sensors, a first sensor of the multiple sensors extending radially outward from a center of the sensor pod parallel to the horizontal plane in a first direction and having a first sensing surface facing outward that is substantially perpendicular to the horizontal plane, and a second sensor of the multiple sensors extending radially outward from the center of the sensor pod parallel to the horizontal plane in a second direction distinct from the first direction and having a second sensing surface facing outward that is substantially perpendicular to the horizontal plane;
a first baffle structure longitudinally disposed around a first periphery of the first sensor and interposed between the first sensor and an outer shell of the sensor pod, the first baffle structure comprising a first crumple zone configured to absorb energy from a first force of a first impact and plastically deform during the first impact when the first impact force is greater than a first impact force threshold;
a second baffle structure longitudinally disposed around a second periphery of the second sensor and interposed between the second sensor and the outer shell of the sensor pod, the second baffle structure comprising a second crumple zone configured to absorb energy from a second force of a second impact and plastically deform during the second impact when the second impact force is greater than a second impact force threshold;
a first plurality of nozzles coupled to the first baffle structure and disposed at the first sensor, a first nozzle of the first plurality of nozzles configured to apply a first fluid and a second nozzle of the first plurality of nozzles configured to apply a second fluid;
a second plurality of nozzles coupled to the second baffle structure and disposed at the second sensor, a third nozzle of the second plurality of nozzles configured to apply the first fluid and a fourth nozzle of the second plurality of nozzles configured to apply the second fluid;
a manifold configured to distribute the first fluid and the second fluid to the multiple sensors;
a first cylindrical sensor extending outwardly from a top surface of the sensor pod along a vertical axis of the sensor pod; and
a second cylindrical sensor extending outwardly from a bottom surface of the sensor pod at an angle to the vertical axis of the sensor pod.

12. The system of claim 11, wherein the first nozzle is configured to apply the first fluid at an oblique angle to the first sensing surface.

13. A vehicle comprising:
a sensor pod comprising a horizontal plane accommodating a plurality of sensors, a first sensor, and a second sensor, the first sensor extending radially outward from a center of the sensor pod in a first direction parallel to the horizontal plane and having a first sensing surface facing outward that is substantially perpendicular to the horizontal plane and a first sensing field of view, and the second sensor extending radially outward from the center of the sensor pod in a second direction distinct from the first direction parallel to the horizontal plane and having a second sensing surface facing outward that is substantially perpendicular to the horizontal plane and a second sensing field of view;
a first baffle structure longitudinally disposed around a first periphery of the first sensor and a second baffle structure longitudinally disposed around a second periphery of the second sensor, the first baffle structure comprising a first crumple zone configured to absorb energy from a first force of a first impact and plastically deforming during the first impact when the first impact force is greater than a first impact force threshold, and the second baffle structure comprising a second crumple zone configured to absorb energy from a second force of a second impact and plastically deforming during the second impact when the second impact force is greater than a second impact force threshold;
a first nozzle coupled to the first baffle structure and disposed adjacent to and directed at the first sensing surface, the first nozzle configured to apply a first fluid to the first sensing surface to clean the first sensing surface;
a second nozzle coupled to the first baffle structure and disposed adjacent to and directed at the first sensing surface, the second nozzle configured to apply a second fluid to the first sensing surface to clean the first sensing surface;
a third nozzle coupled to the second baffle structure and disposed adjacent to and directed at the second sensing surface, the third nozzle configured to apply the first fluid to the second sensing surface to clean the second sensing surface;
a fourth nozzle coupled to the second baffle structure and disposed adjacent to and directed at the second sensing surface, the fourth nozzle configured to apply the second fluid to the second sensing surface to clean the second sensing surface;

a first manifold configured to distribute the first fluid to the first nozzle and the third nozzle;

a second manifold configured to distribute the second fluid to the second nozzle and the fourth nozzle;

a first cylindrical sensor extending outwardly from a top surface of the sensor pod along a vertical axis of the sensor pod;

a second cylindrical sensor extending outwardly from a bottom surface of the sensor pod at an angle to the vertical axis of the sensor pod; and memory storing instructions that, when executed, configure the vehicle to:

determine a first signal associated with the first sensor and a second signal associated with the second sensor;

determine, based at least in part on the first signal and the second signal, an obstruction to at least one of the first sensing surface and the second sensing surface; and determine, based at least in part on the obstruction, whether to apply the first fluid, the second fluid, or both the first fluid and the second fluid.

14. The vehicle of claim 13, wherein the first nozzle is configured to apply the first fluid at an oblique angle to the first sensing surface.

15. The vehicle of claim 13, wherein the first fluid is air and the second fluid is a liquid.

16. The vehicle of claim 13, wherein the first sensing surface comprises a lens, a shield, a windscreen, a casing, or a radome.

17. The vehicle of claim 13, wherein the first crumple zone is further configured to plastically deform during the first impact when the first impact force less than a third impact force threshold that is greater than the first impact force threshold.

18. The vehicle of claim 13, wherein the first fluid comprises air, liquid, water, detergent, cleaning solution, deicer, or alcohol, and the second fluid comprises air, liquid, water, detergent, cleaning solution, deicer, or alcohol.

19. The vehicle of claim 13, further comprising a supply harness coupleable to the vehicle, the supply harness comprising one or more of power, liquid, or pressurized air.

20. The vehicle of claim 13, wherein the first nozzle is disposed adjacent to the first sensing surface outside of the first sensing field of view.

\* \* \* \* \*